Figure 8:
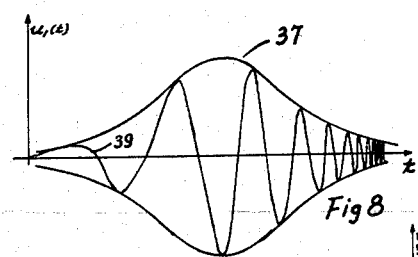

July 3, 1956
R. H. RINES
2,753,448
RADIO-WAVE PULSE SYSTEM
Filed Oct. 6, 1949
6 Sheets-Sheet 1
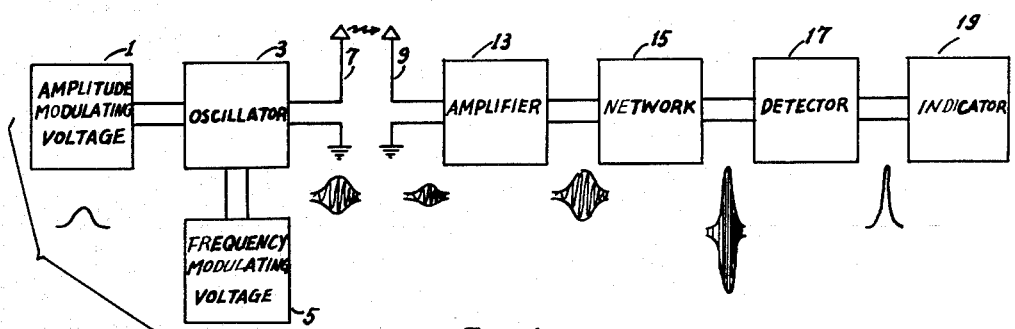
Fig. 1
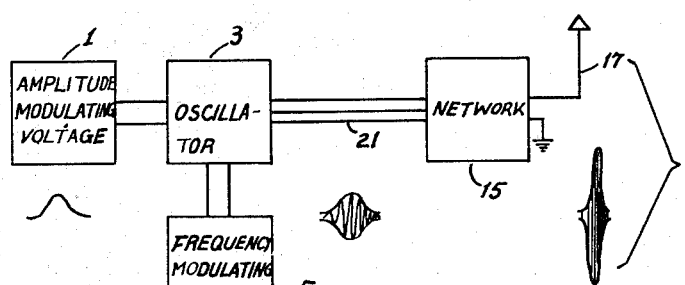
Fig. 2
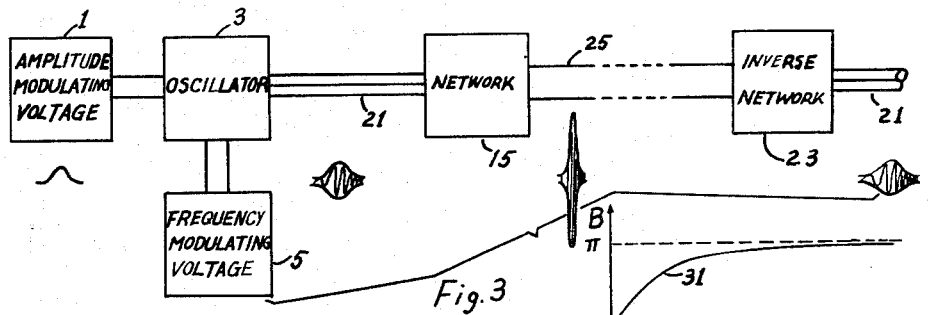
Fig. 3
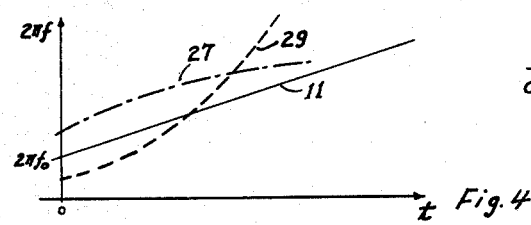
Fig. 4
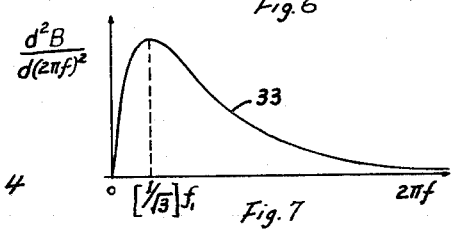
Fig. 6
Fig. 7
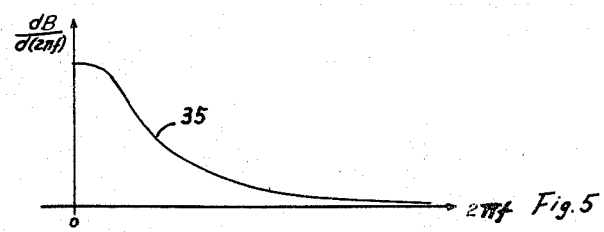
Fig. 5
INVENTOR.
Robert H. Rines
BY Rines and Rines
Attorneys July 3, 1956   R. H. RINES   2,753,448
RADIO-WAVE PULSE SYSTEM
Filed Oct. 6, 1949   6 Sheets-Sheet 2

INVENTOR.
Robert H. Rines
BY Rines and Rines
Attorneys

INVENTOR.
Robert H. Rines
BY Rines and Rines
Attorneys

July 3, 1956  R. H. RINES  2,753,448
RADIO-WAVE PULSE SYSTEM
Filed Oct. 6, 1949  6 Sheets-Sheet 4

INVENTOR.
Robert H. Rines
BY Rines and Rines
Attorneys

July 3, 1956   R. H. RINES   2,753,448
RADIO-WAVE PULSE SYSTEM
Filed Oct. 6, 1949   6 Sheets-Sheet 5

INVENTOR.
Robert H. Rines
BY *Rines and Rines*
Attorneys

July 3, 1956      R. H. RINES      2,753,448
RADIO-WAVE PULSE SYSTEM

Filed Oct. 6, 1949      6 Sheets-Sheet 6

INVENTOR.
Robert H. Rines
BY Rines and Rines
Attorneys

United States Patent Office 2,753,448
Patented July 3, 1956

2,753,448

RADIO-WAVE PULSE SYSTEM

Robert Harvey Rines, Cambridge, Mass.

Application October 6, 1949, Serial No. 119,911

38 Claims. (Cl. 250—6)

The present invention relates to new and improved radio-frequency pulse systems and methods, and more particularly to signal communication.

It has previously been proposed to employ pulsed radio-wave energy as a carrier wave for signal communication. Telegraphic impulses, for example, represent perhaps the earliest application of a pulsed radio-wave carrier. More recently, audio and other signals have been transmitted with the aid of substantially rectangular equally spaced pulses of radio-wave energy. This result has been accomplished by varying the amplitude of the successive radio-frequency pulses in accordance with the desired modulating signal, or by varying the width of the successive pulses in accordance with the signal, or by varying the time of occurence, spacing or phase of the normally equally spaced successive pulses in accordance with the signal, or by a combination of these techniques.

An object of the present invention is to provide a new and improved pulse communication method and system.

Another object is to provide a new and improved method of and system for producing an advantageous type of radio-wave carrier comprising a train of amplitude-modulated phase-distorted pulse carrier waves, the phase distortion of which varies in accordance with a predetermined signal.

Another object resides in substantially linearly frequency-modulating, between predetermined frequency limits, each pulse of a train of amplitude-modulated pulse carrier waves and varying the limits of frequency modulation in accordance with a predetermined signal.

Still a further object is to provide a method and system for producing a train of amplitude-modulated pulse carrier waves phase-distorted in accordance with a predetermined signal and having more energy contained within the lower frequency components of the successive pulse carrier waves than is possible with equivalent rectangular, square, trapezoidal, saw-tooth or similar pulses.

A further feature of the present invention resides in a communication system employing a special network that may compensate for the variable phase distortion of the amplitude-modulated pulse carrier waves, above-mentioned, thereby to vary the pulse width and pulse peak amplitude of the pulse carrier waves in accordance with the variation in phase distortion, while maintaining substantially the same energy in the phase-compensated pulse carrier waves as in the phase-distorted pulse carrier waves, and without distorting the type of shape of the pulse envelopes.

Still a further object of the present invention is to provide a communication system having an improved signal-to-noise ratio for receiving a train of pulse carrier waves of the character described.

Other and further objects will be explained hereinafter and will be more particularly pointed out in the appended claims.

In summary, the present invention provides a method of radio communication that comprises amplitude-modulating and phase-distorting a carrier wave to provide a train of pulse carrier waves, each having a predetermined pulse width and pulse peak-amplitude. The phase distortion of the successive pulse carrier waves is varied in accordance with a predetermined signal, and the phase-distorted amplitude-modulated pulse carrier waves are transmitted. Upon reception, compensation for the varying phase distortion of the successive transmitted pulse carrier waves is effected in order to vary the corresponding pulse width and pulse peak-amplitude in accordance with the variation in phase distortion, thereby to reproduce the signal. For a particular preferred type of train of amplitude-modulated phase-distorted pulse carrier waves in which the phase distortion is produced by a substantially linear frequency modulation of the successive pulse carrier waves, the frequency limits of which are varied in the successive pulse carrier waves in accordance with a predetermined signal, and the amplitude modulation is effected substantially in accordance with an "error function" or Gaussian distribution, compensation for the phase distortion may be effected while maintaining the energy of the pulse carrier waves substantially constant, and without changing the type of shape of the pulse carrier waves. Preferred networks for phase-compensating the amplitude-modulated variable phase-distorted pulse carrier waves to reduce or to increase the pulse width and to increase or to reduce the pulse peak-amplitude, respectively, depending upon the character of the network, are hereinafter treated in detail.

Figure 10:
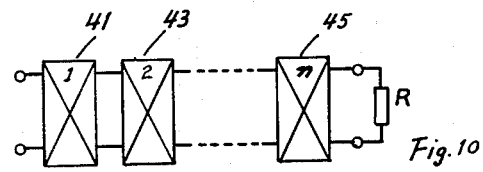
Figure 9:
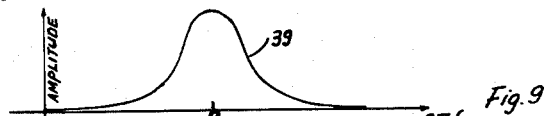
Figure 11:
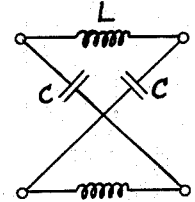
Figure 12:
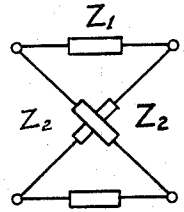
Figure 13:
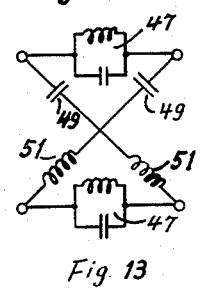
Figure 14:
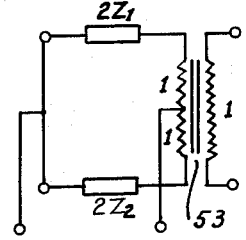
Figure 15:
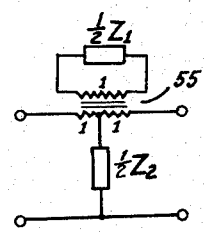
Figure 16:
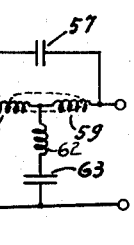
Figure 17:
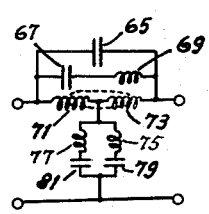
Figure 18:
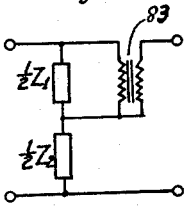
Figure 19:
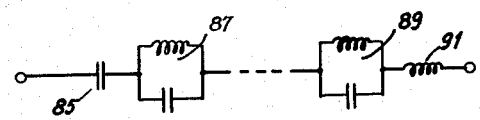
Figure 20:
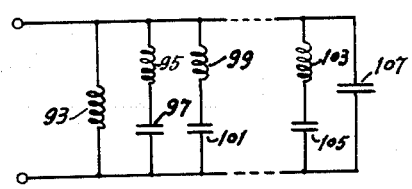
Figure 21:
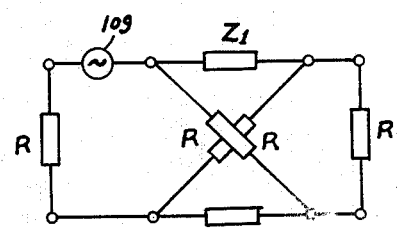
Figure 22:
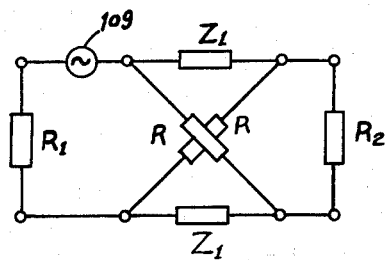
Figure 27:
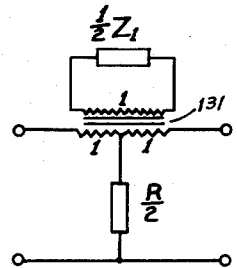
Figure 28:
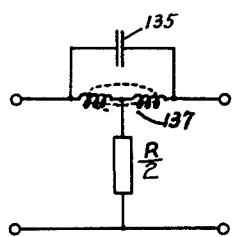
Figure 29:
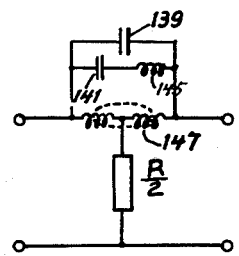
Figure 30:
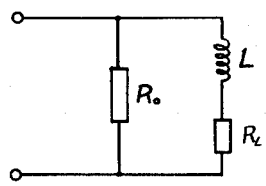
Figure 31:
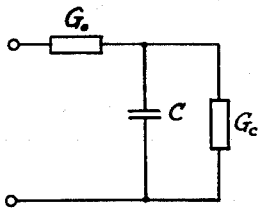
Figure 32:
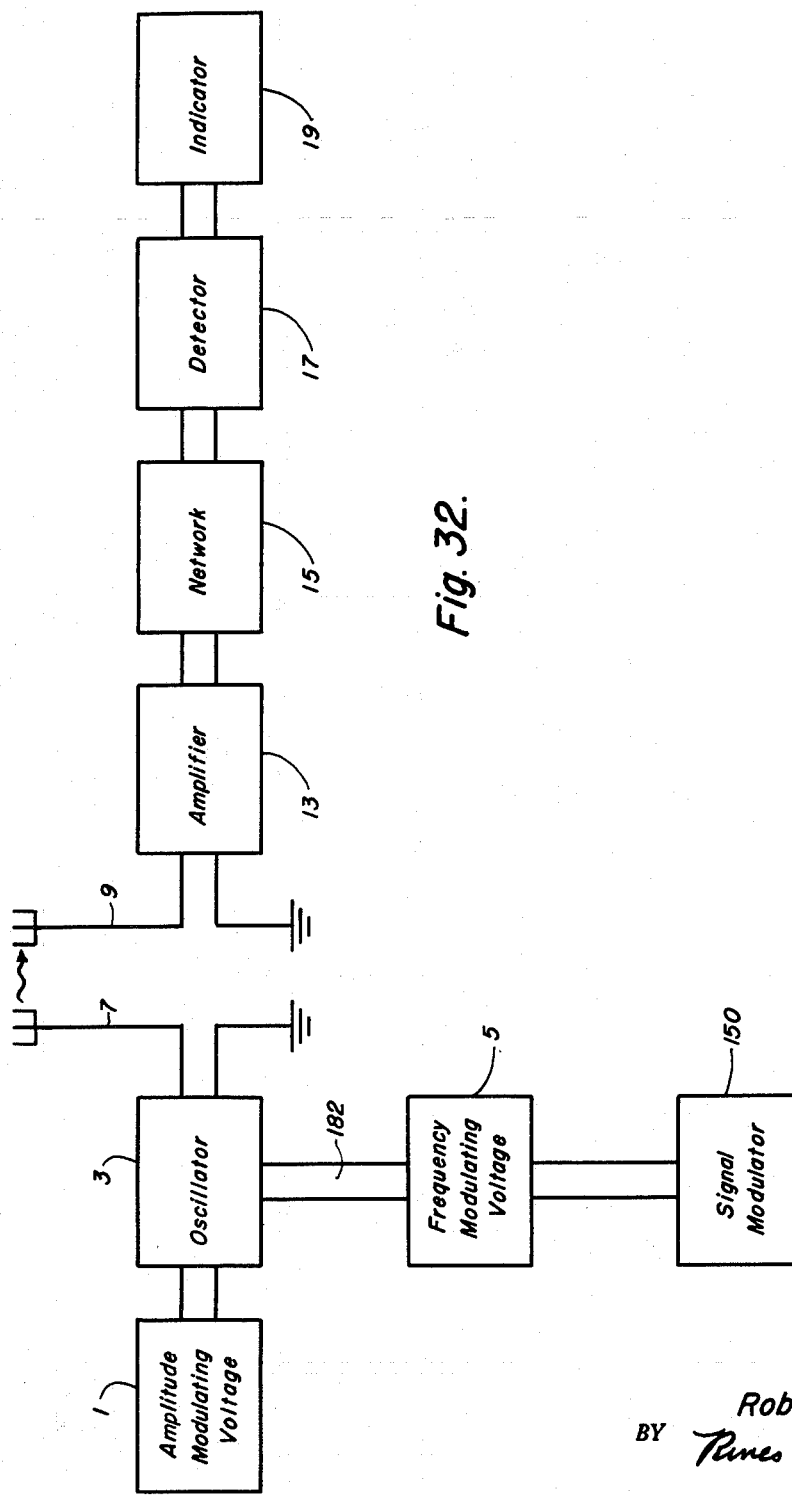
Figure 33:
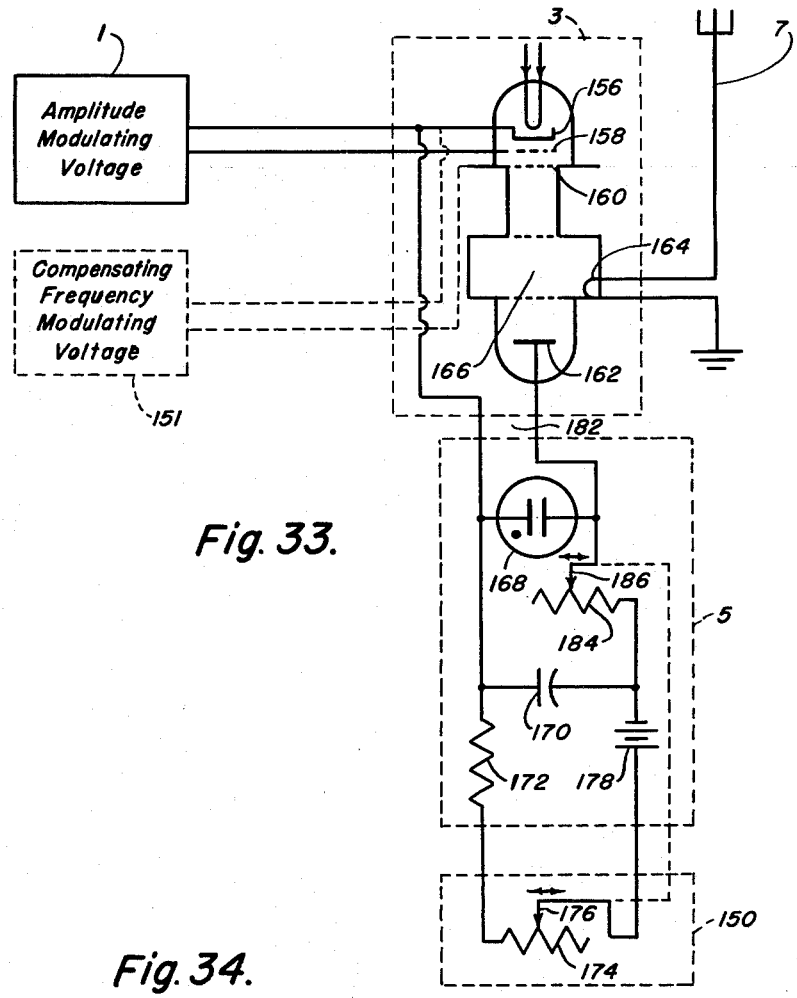
Figure 34:
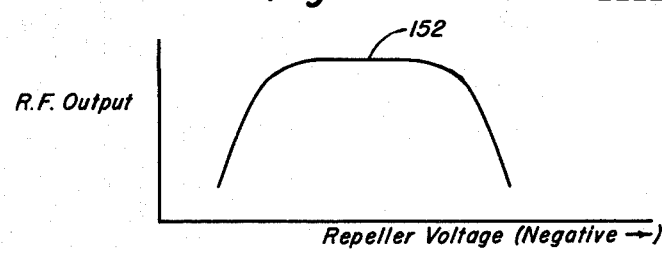
Figure 35:
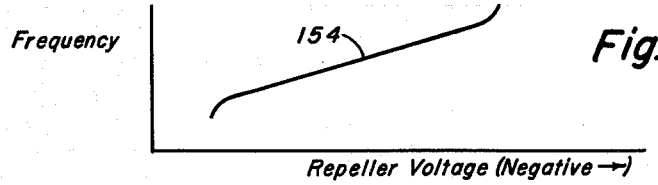
Figure 36:
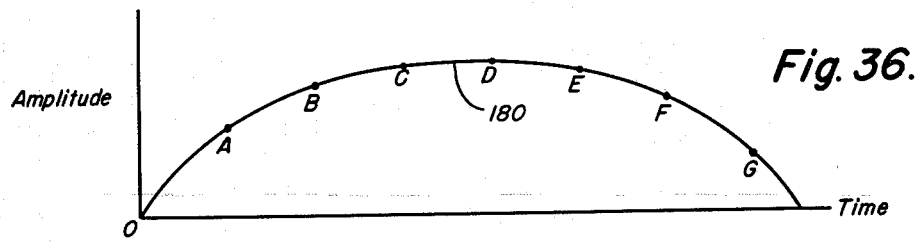
Figure 37:
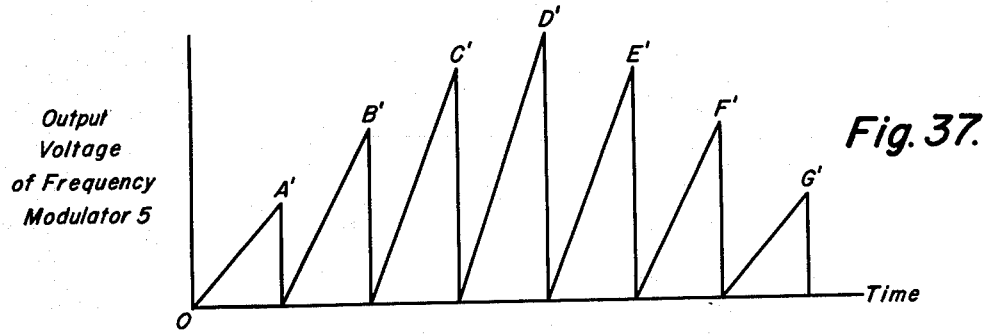
Figure 38:
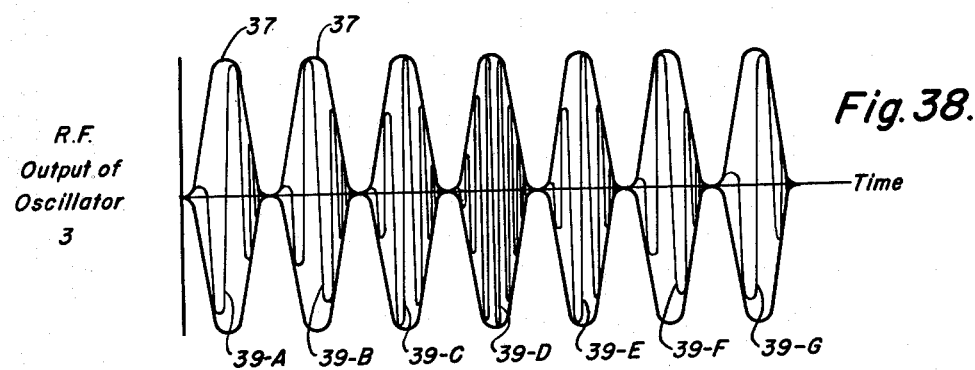
Figure 39:
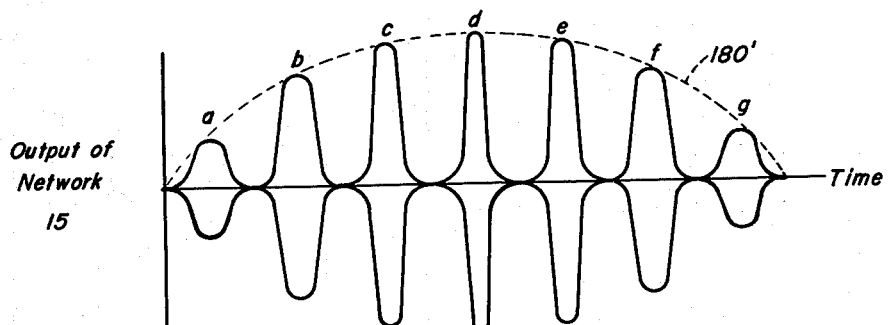

The invention will now be more fully described in connection with the accompanying drawings, Fig. 1 of which is a block diagram illustrating a radio-wave transmitting and receiving system, the transmitting portion of which is adapted to produce an amplitude-modulated phase-distorted pulse carrier wave, and the receiving portion of which embodies a network for compensating for the phase distortion of the pulse carrier wave; Fig. 2 is a similar block diagram of a transmitting system embodying a phase-distortion compensating network; Fig. 3 is a similar diagram of a modified transmitting system embodying a plurality of networks of the character described; Figs. 4, 5, 6 and 7 are explanatory graphs, Fig. 4 illustrating preferred variations of the carrier frequency of a preferred pulse carrier wave with time, Fig. 5 illustrating the variation of the rate of change with frequency of the phase function characteristic of a preferred network as a function of frequency, Fig. 6 illustrating the variation of the phase function characteristic of the network with frequency, and Fig. 7 illustrating the variation with frequency of the derivative of the rate of change of the phase function characteristic illustrated in Fig. 5 with respect to frequency; Fig. 8 is a wave form of a preferred amplitude-modulated phase-distorted pulse carrier wave; Fig. 9 is a frequency-spectrum graph plotting the amplitude of the various frequency components comprising the preferred type of amplitude-modulated phase-distorted pulse carrier wave illustrated in Fig. 8; Fig. 10 is a block diagram of a multi-section network, preferably of the cascade or lattice type, with the aid of which the present invention may be practiced; Fig. 11 is a circuit diagram of a simple lattice network section for use in the system of Fig. 10; Fig. 12 is a generalized network equivalent to the network of Fig. 10, having four generalized impedance elements; Fig. 13 is a circuit diagram illustrating an example of the generalized network of Fig. 12 employing eight reactance circuit elements; Fig. 14 is a schematic diagram of a network fully equivalent to the lattice network of Fig. 12 but employing only two generalized impedances; Fig. 15 is a similar equivalent network employing two impedance elements in conjunction with an ideal transformer; Figs. 16 and 17 are specific examples of equivalent networks of the type represented generally in Fig. 15, employing, respectively, four and eight circuit elements; Fig. 18 is a schematic diagram of a generalized network equivalent to the generalized networks of Figs. 10, 12, 14 and 15 employing two generalized reactance elements and an output transformer; Figs. 19 and 20 illustrate typical types of circuit elements that may be employed as arms in the generalized networks of Figs. 12, 14, 15 and 18; Fig. 21 is a Darlington-type network equivalent to the lattice-type network of Figs. 12, 14, 15 and 18, employing two impedance elements and two diagonal resistive elements, the network having an over-all added constant attenuation of 6.02 decibels; Fig. 22 is a more generalized Darlington-type of circuit equivalence to the network of Fig. 21, in which the input and output loads of the network are different, and the two diagonal resistive arms have values corresponding to the geometric mean of the input and output loads, the network having an over-all added constant attenuation; Figs. 23, 24, 25 and 26 illustrate different examples of impedance elements that may be employed as arms in the Darlington-type networks of Figs. 21 and 22; Fig. 27 is a schematic diagram of a network equivalent to the Darlington-type networks of Figs. 21 and 22, in which the number of generalized impedance elements is reduced to one with the aid of a resistive element and an ideal transformer; Figs. 28 and 29 are circuit diagrams illustrative of networks of the generalized type shown in Fig. 27, having, respectively, two and four reactive circuit elements; Figs. 30 and 31 are equivalent circuit diagrams of impedance elements that may be respectively employed as the arms L and C of the network of Fig. 11, taking into account the dissipative effects of practical coils and condensers and the effects of any arbitrary constant attenuation added to the network without altering the phase function of the network; Fig. 32 is a block diagram of a preferred embodiment of the present invention; Fig. 33 is a more detailed circuit diagram of the transmitting portion of the preferred embodiment; Figs. 34 to 39 are illustrative graph and wave-form diagrams, Figs. 34 and 35 illustrating, respectively, the variation with voltage of the output and frequency of the oscillator of Fig. 33, Fig. 36 representing a predetermined modulating signal, Fig. 37 illustrating sweep voltages produced in accordance with the signal, Fig. 38 showing the amplitude-modulated variably phase-distorted pulse carrier waves produced by the system of Figs. 32 and 33, and Fig. 39 illustrating the output of the phase-compensating network that receives the pulse carrier waves of Fig. 38.

Referring first to Fig. 36, assume that a modulating signal 180, of any form or type, is desired to be transmitted, the signal, for example, increasing with the time from zero amplitude, at the extreme left, through points A, B and C to a maximum amplitude D, and then decreasing through points E, G and F back to zero at the extreme right. In accordance with the preferred embodiment of the present invention illustrated in Figs. 32 and 33, this signal 180 is transmitted by sampling with the aid of a train of pulse carrier waves, the successive amplitude-modulation envelopes 37 of which are illustrated in Fig. 38. The carrier frequency 39-A of the first or left-hand pulse carrier wave is shown increasing in value during the pulse from a predetermined lower frequency limit to an upper limit. The variation in frequency of the carrier wave during the pulse results in phase distorting the pulse carrier wave. The difference between the frequency limits of variation of the pulse carrier-wave frequency during the pulse corresponds to the amplitude of the signal 180, Fig. 36, at point A. The carrier frequency 39-B of the second pulse carrier wave from the left is shown increasing from the same predetermined lower frequency limit to a higher upper frequency limit than that of the first pulse carrier wave 39-A. This greater difference between frequency limits corresponds to the greater amplitude B of the signal 180. The difference between the frequency limits of the next pulse carrier wave 39-C is still greater, the carrier frequency varying from the same predetermined lower limit at the commencement of the carrier wave pulse to an even higher upper limit to correspond to the greater amplitude of the signal 180 at point C. The difference between the frequency limits of carrier-wave variation are shown greatest for the pulse carrier wave 39-D to correspond to the maximum signal amplitude D, while the difference between the frequency limits of carrier-frequency variation in the successive pulse carrier waves 39-E, 39-F, and 39-G successively decreases to correspond to the successively decreasing amplitudes E, F, and G of the signal 180.

To all outward appearances, therefore, a train of similar equal-amplitude, equal-width and equally spaced carrier wave pulses are transmitted and no signal intelligence would be discernible if such pulses were received in an ordinary receiver.

With the aid of a special network at the receiver, however, compensation may be effected for the phase distortion introduced by the variable frequency modulation of the successive pulse carrier waves during the successive pulses, thereby, for example, to narrow and peak the pulses in accordance with the degree of phase distortion.

The pulse carrier waves, after transmission, are received with reduced signal strength or amplitude. The received pulses are fed to an appropriate phase-compensating network, hereinafter described in detail, that may peak the received pulses and reduce their pulse widths in accordance with the degree of phase distortion in the pulses. The received pulse corresponding to the transmitted pulse 39-A, for example, is shown in Fig. 39, peaked to produce a pulse $a$, and the received pulse carrier waves corresponding to the transmitted pulse carrier waves 39-B, 39-C, 39-D, 39-E, 39-F, and 39-G are shown respectively peaked by the phase-compensation network to produce corresponding successive pulses $b$, $c$, $d$, $e$, $f$, and $g$. The radio-frequency oscillations within the pulses $a$, $b$, $c$, $d$, $e$, $f$, and $g$ are not shown in Fig. 39 for purposes of simplicity. If, as in accordance with the preferred embodiment of the present invention, the energy of the pulses is maintained substantially constant as they pass through the phase-compensating network, the pulse $a$ will be shorter and wider than the phase $b$ since there is less phase-distortion in the pulse carrier wave 39-A than in the pulse carrier wave 39-B as a result of the smaller difference between the frequency limits of the pulse carrier wave 39-A. Similarly, pulse carrier wave 39-C will emerge from the network as a pulse $c$ that is peaked higher and narrower than the preceding pulse $b$, resulting from phase compensation by the network of the pulse carrier wave 39-B. The pulse carrier wave 39-D, upon passing through the network, will emerge as a pulse $d$ of maximum peak amplitude and minimum pulse width. The next successive pulse carrier waves 39-E, 39-F and 39-G will emerge, respectively, as pulses $e$, $f$ and $g$ of successive decreasing pulse peak-amplitude and successive increasing pulse width. It may be seen that the envelope of the pulses $a$, $b$, $c$, $d$, $e$, $f$ and $g$ reproduces a signal 180' having characteristics similar to those of the original signal 180, Fig. 36.

Having described the physical operation of the preferred form of the present invention, it is now in order to treat more fully the principles underlying the phase-distortion of an amplitude-modulated pulse carrier wave and the principles of appropriate phase-compensating networks that may be used in the present invention, before treating the preferred methods and circuits for practising the present invention.

If it is desired to mislead a receiving station, such as an enemy station, receiving the pulse carrier waves, but unequipped with a special phase-compensating network, the pulses need not be equally spaced, as shown in Fig. 38, but may be unequally spaced in any desired manner, and the spacing may, if desired, be varied, as is well-known in the art, to place a false message in the form of pulse time modulation upon the train of pulse carrier waves. The present invention relies upon the compensation of phase distortion in the pulse carrier waves themselves and not upon their relative phase or time positions, and so long as the degree of phase distortion at a given time is related to the modulating signal at that time, varying the time or spacing of the successive pulses will have no effect at all upon reproducing the desired intelligence in the network employed in the present invention. To any other receiving station, however, the false message would be the only intelligence discernible.

Referring now to Fig. 1, a radio-wave oscillator or generator 3 is shown connected to an antenna system 7 for transmitting the carrier-frequency oscillations produced in the oscillator 3 into space as a radio-frequency carrier wave.

An amplitude modulator 1 may control the amplitude of the oscillations produced by the oscillator 3 by feeding an amplitude-modulating voltage to the oscillator. The amplitude-modulating voltage may, for example, comprise a pulse envelope of the type shown directly below the modulator 1, thereby to produce an amplitude-modulated pulse carrier wave of the same pulse envelope. For purposes of explanation, it will be assumed at this stage, that but a single pulse carrier wave is produced. Actually, as hereinafter explained, a train of pulse carrier waves is employed in accordance with the present invention. It is desired to phase-distort the pulse carrier wave so produced. The phase distortion may be produced while the carrier wave is being amplitude modulated, as, for example, by frequency modulating the oscillator 3 by means of a frequency-modulating voltage from a frequency modulator 5 during the amplitude modulation of the oscillator 3. The frequency modulation may, of course, be produced after or before the amplitude modulation, as well.

In accordance with the preferred embodiment of the present invention, as hereinafter more fully discussed, the phase-distortion of the amplitude-modulated carrier wave is produced by frequency modulating the oscillator 3 with a substantially linearly changing frequency modulation, the frequency of the carrier wave changing preferably in one direction only during each amplitude-modulated pulse.

The amplitude modulator 1, as will hereinafter be discussed in more detail, may produce any desired amplitude-modulation pulse envelope upon the carrier wave produced by the oscillator 3, though it is preferable, for many applications of the present invention, to employ an amplitude-modulation pulse envelope approximating an "error function" or Gaussian function. A voltage-wave having this envelope, may, for example, be produced by networks of the type discussed in "Wave Forms," chapter 8, Radiation Laboratories Series (RLS) No. 19, McGraw-Hill.

The "error function" amplitude modulation and the substantially linearly changing frequency modulation of the oscillator 3 produce a pulse of predetermined pulse width and pulse peak amplitude that may be transmitted into space by the antenna 7.

A receiver antenna 9 receiving the transmitted pulse may first amplify it in an amplifier 13, as illustrated by the wave-form shown in Fig. 1 below the output connections from the amplifier 13. The amplifier 13 then transmits the pulse to a specially designed network 15. This network 15 will be treated later in much detail, but for present purposes it will be assumed that this network is of such character as to compensate for the phase distortion in the received pulse, fed as an input pulse into the network 15, so as to decrease the pulse width and to increase the pulse peak-amplitude while the pulse is transmitted through the network 15, producing a peaked output pulse as shown below the output connections of the network 15. The output pulse of the network 15, may, by proper design of the network, moreover, have precisely the same type or shape of "error function" envelope as the input pulse and may have substantially the same energy as the energy in the input pulse. Though the shapes of the input and output pulses remain the same, in the sense that the envelopes of both pulses describe the same kind or type of curve represented by the same type of equation, the constants of the pulse-envelope equations are different so that the pulse width and pulse peak amplitude of the input and output pulses are different. Since the same type of wave-shape is produced for the envelope of the output pulse as for the envelope wave-shape of the input pulse, spurious spikes, overshoots or oscillations in the output pulse, such as those that occur when currently employed rectangular pulses are shaped in present-day circuits, are avoided. The sharply peaked or amplified output pulse from the network 15 may then be detected in a detector 17 and the resulting direct-current impulse from the detector 17, shown below the output connections of the detector 17, may be displayed upon an indicator 19 such as a meter or cathode-ray tube or used in some other device that may respond to the resulting voltage impulse.

Since this output pulse is sharp, it may be employed for distance measurements and similar purposes, as well as communication. The advantages of a system employing such pulses and pulse networks over present-day pulse navigational and other systems is several fold. In the first place, the network 15 may only be provided on friendly ships or aircraft so that only such will obtain from the broad input pulse a sharply peaked, amplified pulse having the same type of amplitude-modulation envelope, thereby to permit accurate range measurements by reference to predetermined portions of the pulse. A hostile craft or other object receiving the same broad input pulses, however, since unequipped with the network 15, will receive only the relatively broad input phase-distorted pulses and cannot, therefore, use this information for accurate distance or range-measuring purposes. If attempts are made in the hostile or other craft to peak the input pulse with present-day pulse-shaping circuits, moreover, the same type of pulse envelope cannot be maintained during the pulse shaping, and accurate distance measurements with reference to predetermined portions of the pulse cannot be made.

Another advantage of systems employing such pulse carrier waves and networks is that any interference signal, such as noise or other transmissions of radio energy picked up by the receiving antenna 9 will not be peaked by the network 15 since the network is designed to peak only particular pulse signals having a predetermined type of phase-distortion. Though the output of the network 15 will contain the noise frequencies and the interfering signal frequencies, only the desired pulse carrier wave will be amplified, so that the signal-to-noise ratio of this receiving system has become markedly improved.

A further feature of this type of system is that the input signal, comprising the phase-distorted pulse carrier wave may even be of less signal strength or intensity than interfering signals or noise. Though the amplifier 13 may then produce in its output circuit noise and interfering signals of greater signal intensity than the intensity of the desired pulse, the network 15 sharply discriminates against the noise and interfering signals, passing with amplification only the desired pulse signals, and permitting, therefore, the detection of a signal which could not have been received by any other type of receiver because its signal intensity was less than the intensity of the noise or interfering signals also received. These improved signal-to-noise features of the present invention, above-described, are, of course, also very important when the systems of the present invention are employed for pulse communication, remote control transmissions, such as for guiding missiles, and other purposes.

There are occasions where a pulse carrier wave must be fed through an electric system which can not support very high peak voltages. The output of the oscillator 3, for example, may feed a coaxial line 21, Fig. 2, the dielectric medium between the conductors of which may break down in the presence of very high peak-pulse voltages. In accordance with the techniques employed in the present invention, however, phase-distorted pulse carrier waves of relatively low peak-pulse amplitude may be fed to the coaxial line 21 by the oscillator 3 without danger of breakdown on the line 21. The coaxial line 21 may then feed this low peak-power pulse, shown therebelow in Fig. 2, to the input terminals of the previously mentioned specially designed network 15. The network 15 will sharply peak and amplify the input pulse into a high-peak-power amplitude-modulated pulse carrier wave having, preferably, substantially the same shape as the shape of the input pulse and substantially the same amount of energy, though of very much shorter pulse duration and of higher pulse peak-amplitude, as illustrated, for transmission into space by, for example, the antenna 17. It is to be understood, of course, that a coaxial line or other transmission line is not the only type of system in which it may be necessary to produce first, a relatively low pulse peak-amplitude and later, by means of the network 15, to increase the peak power of the pulse. Electrical components such as condensers, inductances and the like, as well as other electric circuits including wave guides and cavity resonators, all have breakdown potentials which may require the initial use of relatively low peak-amplitude pulses. The network 15 will permit the sharp peaking of these low pulse-amplitude waves after they have passed through the critical circuits. It is also to be understood that since the network 15 may sharply reduce the pulse width of the input pulse, it finds application also where it is desired ultimately to employ a narrow pulse, but where the time constants of the circuits employed are such as to permit only the passage of a relatively wide pulse. With the aid of the network 15, the wide pulse may be passed through the critical circuits and then sharply narrowed in the network.

Networks employed in accordance with the present invention may be designed not only to shorten or narrow the pulse width or duration of an input pulse and simultaneously to peak the pulse amplitude, but also to increase the pulse width or duration and to reduce the pulse peak-amplitude. If, for example, the peaked output pulse of the network 15 of Fig. 2 is fed to an open wire transmission line 25, instead of to the antenna 17, as shown in Fig. 3, it may be desired, after transmission along the transmission line 25, to reconvert the peaked pulse into a broad pulse of lower peak-amplitude. Such a reconversion may be called for, for example, in the event that the pulse is to be fed along a further section of a coaxial line 21 of low breakdown potential. To the attainment of this end, a reverse network 23, designed in accordance with principles similar to those hereinafter described, may be employed to produce phase distortion in the peaked-pulse output of the network 15 in order to produce an amplitude-modulated phase-distorted pulse of wider duration than the peaked pulse and of lesser pulse peak-amplitude, as illustrated below the right-hand output coaxial line 21 leading from the network 23.

While, as before mentioned, the present invention may be applied to any phase-distorted amplitude-modulated pulse carrier wave, the "error function" amplitude modulation, and the substantially linearly varying frequency modulation, previously discussed, are advantageous for many applications.

In Fig. 8, a preferred pulse carrier wave of the character described is illustrated. The carrier wave 39 is shown varying in frequency with time according to the equation $$\cos(2\pi f_0 t + \beta t^2 + \phi) \qquad (1)$$

where $\pi$ is the ratio of the circumference to the diameter of a circle, $f_0$ is the frequency of the pulse carrier wave at the initial time $t=0$ at the commencement of the pulse oscillations, $2\beta$ is the rate of change of the linearly varying carrier-wave frequency $f$, and $\phi$ is the phase of the carrier wave at the initial time $t=0$. When amplitude-modulated with an "error function" envelope 37, the pulse carrier wave 39 may be represented by the equation $$u_1 = e^{-\alpha} \cos(2\pi f_0 t + \beta t^2 + \phi) \qquad (2)$$

where $e$ is the base of natural logarithms, $\alpha$ is an attenuation constant of the pulse carrier wave, and the function $$e^{-\alpha t^2}$$

is the "error function" or Gaussian distribution.

Equations 1 and 2 describe the substantially linear variation of carrier-wave frequency with time plotted along the solid curve 11 of Fig. 4. Actually the angular carrier-wave frequency $2\pi f$ is plotted, but reference will hereinafter be made to the carrier-frequency $f$ only. As before mentioned, however, it is not necessary that this variation be linear. It may, for example, have the upward concave slope of curve 29, Fig. 4, or it may, as another illustration, have the convex curve 27 of Fig. 4. It is preferable, however, that the frequency of the pulse carrier wave varies with time in one direction only, either increasing or decreasing, during the pulse. In Fig. 4, the intersection of the curve 11 with the ordinate, labelled $2\pi f_0$, represents the initial carrier frequency $f_0$ of the carrier pulse wave at time $t=0$, and the similar points of intersection of the curves 27 and 29 with the ordinate represent the initial carrier frequencies at time $t=0$ for pulses having frequency modulation of the type described by the curves 27 and 29. The frequency-modulating of the pulse carrier wave 39, as above described, produces phase distortion in the wave. This may have the effect of broadening out the pulse width of the wave and decreasing its pulse amplitude. By determining the law of the phase distortion, therefore, one may select a predetermined pulse width and pulse peak-amplitude for the wave. It is to be understood, however, that phase distortion may be produced by other means than by frequency modulation. It may be produced, as another illustration, by phase-modulating a constant frequency carrier wave during each pulse in accordance with techniques well-known in the art.

The spectrum function of the preferred pulse of Fig. 8 is illustrated in Fig. 9 in which the amplitudes of the various frequency components of the phase-distorted pulse carrier wave are plotted as a function of frequency. From this distribution of the spectrum function, it is clear that most of the energy of a pulse of the character described is confined to a relatively narrow bandwidth and that the energy in the frequency components markedly spaced from the center frequency component, labeled 0, is extremely small. A pulse of this nature, therefore, can provide more energy for a given bandwidth than can an equivalent rectangular, square, trapezoidal, saw-tooth, or other type of presently used pulse, since the spectrum functions of these pulses have considerable energy in the side frequencies.

Assuming, therefore, that the phase distortion of the amplitude-modulated pulse carrier wave 37—39 is such as to produce a predetermined pulse width, it is desirable, at this point, to define exactly what is meant by the "pulse width." In the case of rectangular pulses, the pulse width is generally measured either from zero amplitude to zero amplitude or between half-voltage or half-power points. It has been found more convenient, however, to employ the following general definition for the pulse width of any shaped pulse including the pulse of Fig. 8:

$$\tau_1 = 2\sqrt{3} \sqrt{\frac{\int_{-\infty}^{\infty} t^2 u_1^2 \, dt}{\int_{-\infty}^{\infty} u_1^2 \, dt}} \qquad (3)$$

where $u_1$ is the equation of the pulse carrier wave having the form expressed in Equation 2 for the case of the pulse-wave of Fig. 8. In the case of a rectangular pulse, this general Equation 3 reduces to a form that corresponds to one of the present-day definitions of pulse width, namely, the width from the beginning of the pulse to the end of the pulse.

It now remains to explain how to design a network which will compensate for the phase distortion of, for example, the preferred pulse of Fig. 8 in order to vary the pulse width and the pulse peak-amplitude.

A schematic diagram of a lattice-type multi-section network is illustrated in Fig. 10, having sections 41, 43, ... 45, representing, respectively, the first, second, and $n^{th}$ sections of the network, and terminating in a loading resistance R preferably equal to the characteristic impedance of the network. The complete network 41, 43, ... 45, is employed as the network 15, described in connection with Figs. 1 to 3. An equivalent network circuit is illustrated in Fig. 12 having two series arms $Z_1$ and two diagonal arms $Z_2$. Each network section 41, 43, ... 45 may, for example, comprise two series inductances L and two diagonal capacitances C, as shown in Fig. 11. The preferred pulse of Fig. 8, represented by Equation 2 and having an initial pulse width $\tau_1$ given by Equation 3, is to be sent as an input pulse into a network of the general character illustrated in Figs. 10, 11 and 12. If this network is properly designed, the output pulse emerging from the network will have a narrower pulse width $\tau_2$ and a higher pulse peak-amplitude than the input pulse, and yet will have the same type or shape of "error function" amplitude envelope and substantially the same energy content as the input pulse.

The applicant's method of phase-distorting an amplitude-modulated pulse carrier wave and of compensating for the distortion to peak or broaden the pulse envelope, is, of course, of general application to any type of modulation envelope and to any type of phase distortion. Since, however, there exists a preferred type of "error function" pulse amplitude modulation and a preferred type of frequency-modulation phase-distortion for which a preferred network may be designed that has the desirable features of maintaining the same type or shape of pulse envelope during the phase-compensation produced by the network, as it, for example, peaks the pulse, and since such a network can produce the peaking substantially without loss of energy, emphasis will hereinafter be placed upon these preferred embodiments. It is to be understood, however, that the broad principles of the present invention are not restricted to these preferred embodiments, but are equally applicable to other types of pulse envelopes, other types of phase-distortion and other types of phase-compensating networks employed in accordance with the teachings of the present invention, even though these other pulse envelopes, phase-distorting methods and phase-compensating devices do not produce all the advantageous features of the preferred embodiments of the present invention. Other envelopes than the "error function," for example, in which the area under the envelope can remain constant as the envelope is narrowed may also advantageously be employed.

The proper design of a network that is to produce the previously described results with the aid of the preferred pulse-wave of Equation 2, will now be treated.

Considering first the generalized network of Fig. 12, which, as before mentioned, is equivalent to the lattice-type multi-section network of Fig. 10, in order to produce the above-mentioned desired results, the generalized series arms $Z_1$ must have a value given substantially by the relation $$Z_1 = \frac{RjU_m(f)}{G_m(f)} \quad (4)$$

and the generalized diagonal arms $Z_2$ must have a value given substantially by the equation $$Z_2 = \frac{RG_m(f)}{jU_m(f)} \quad (5)$$

where R is the loading resistance of the network, $G_m$ is the even or real part and $U_m$ is the odd or imaginary part of the function $$\frac{(f_0\sqrt{3} - jf)^n}{(f_0\sqrt{3} + jf)^n} \quad (6)$$

The subscript $m$ in Equations 4 and 5, above, are integers and may, for example, be equal to $n$, the number of network sections of the type shown at 41, 43 ... 45 in Fig. 10 or of the type shown in Fig. 11. Under such conditions, for example, the series inductive arms L of the network section of Fig. 11 will each have a value given substantially by $$L = \frac{R}{2\sqrt{3}\pi f_0} \quad (7)$$

and the two diagonal capacitive arms C are determined substantially by the expression $$C = \frac{1}{2\sqrt{3}\pi f_0 R} \quad (8)$$

Such a network passes all frequencies, though, of course, not with constant attenuation.

If $\tau_1$ is the width of the input pulse of the character described by Equation 2 and illustrated in Fig. 8, and the product $\tau_1 f_0$ of $\tau_1$ and the initial carrier frequency $f_0$ of the pulse carrier wave 39 at time $t=0$ is very much greater than 0.276, and if it is desired to produce an output pulse of lesser width $\tau_2$ than the width of the input pulse, then $n$ network sections having impedance values as above described in connection with Equations 4 to 8 are required as given by the relation $$n = 15.2 f_0 p \tau_1 \tau_2 \quad (9)$$

where $p$ is that constant equal to or less than unity, but as near to unity as possible, required to render $n$ the nearest whole number, and where $\tau_2$ is measured in the same manner as $\tau_1$ in terms of the output pulse-wave $u_2$, as follows:

$$\tau_2 = 2\sqrt{3} \sqrt{\frac{\int_{-\infty}^{\infty} t^2 u_2^2 dt}{\int_{-\infty}^{\infty} u_2^2 dt}} \quad (10)$$

With $n$ network sections designed in accordance with the above conditions, the output pulse wave $u_2$ emerging from the network is found to be represented by the equation $$u_2 = \sqrt{\frac{\tau_1}{\tau_2}} e^{-\epsilon(t')^2} \cos\left\{2\pi f_0 t' + \xi(t')^2 + \left(\frac{\sqrt{3}}{2} - \frac{\pi}{3}\right)n + \phi + \psi\right\} \quad (11)$$

where $$\epsilon = \alpha\left(\frac{\tau_1}{\tau_2}\right)^2$$

$$t' = t - \left(\frac{1}{2\pi}\right)\left(\frac{dB}{df}\right)_{f=f_0}$$

$$B = jn \ln\left(\frac{k\sqrt{3}f_0 - jf}{k\sqrt{3}f_0 + jf}\right)$$

$j$ is the operator $\sqrt{-1}$, $k$ is a constant in the neighborhood of unity, $$\xi = \left[\beta - \left(\frac{1}{2\pi}\right)\left(\frac{dB}{df}\right)_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

It is to be observed that the amplitude variation $$e^{-\epsilon(t')^2}$$

of the output pulse $u_2$, Equation 11, still has the Gaussian type of distribution or "error function" shape of the input pulse wave $u_1$ given by Equation 2, though having a different constant. In order to insure that during the time corresponding to the desired pulse duration a sufficient number of carrier-wave oscillations will be produced to support an "error function" signal modulation, thereby to insure that the output pulse has exactly the same type of envelope shape as the input pulse, the following conditions must also be satisfied:

$$2\pi f_0\left(\frac{1}{2\sqrt{\alpha}}\right) - \beta\left(\frac{1}{2\sqrt{\alpha}}\right)^2 \gg 2\pi \qquad (12)$$

and $$2\pi f_0\left(\frac{1}{2\sqrt{\alpha}}\right) - |\xi|\left(\frac{1}{2\sqrt{\epsilon}}\right)^2 \gg 2\pi \qquad (13)$$

where $|\xi|$ is the magnitude of the function $\xi$ of Equation 11 and $\gg$ is a symbol meaning very much greater than. It then follows that terms $\alpha$ and $\beta$, Equation 2, are determined by $$\alpha = \frac{3}{\tau_1^2} \qquad (14)$$

and $$\beta = \frac{1 - \left(\frac{\tau_1}{\tau_2}\right)\sqrt{1-p^2}}{\sqrt{3}} \left(\frac{8\pi^2 f_0^2}{n}\right) \qquad (15)$$

Equation 15 reduces to $$\beta = \frac{8\pi^2 f_0^2}{\sqrt{3}\, n} \qquad (16)$$

for the special case when the constant $p=1$.

By passing the preferred pulse described by Equation 2, having an input pulse width $\tau_1$ given by Equation 3, through $n$ sections of the type shown in Fig. 11, arranged successively in cascade or tandem, as shown in Fig. 10, where the sections have inductance and capacitance values respectively determined by Equations 7 and 8, an output pulse is produced having a pulse width $\tau_2$ that is very much narrower than the input pulse width $\tau_1$ and a peak-amplitude that is very much greater than the peak-amplitude of the input pulse. Neglecting dissipation in the network, moreover, the energy in the output pulse may be shown to be equal to the energy in the input pulse. If the coils and condensers do produce some dissipation, the energy in the output pulse will still be very nearly equal to the energy in the input pulse.

As an illustration of typical values for network components in a one-section network of the type illustrated in Fig. 11 for passing a phase-distorted amplitude-modulated pulse carrier wave of the type given by Equation 2, having an initial carrier frequency $f_0$ at time $t=0$ of one megacycle and a load resistance R of 150 ohms, each of the series inductances L may have a value of 13.78 microhenries and each of the diagonal capacitances C may have a value of 612.6 micro-microfarads, in order to convert such an input pulse of width $\tau_1$ into an amplified high peak-amplitude output pulse of narrower pulse width $\tau_2$, as given by the relation $$\tau_1 = \frac{1 \times 10^6}{15.2 \times 10^6 \tau_2}$$

The characteristics of a network designed as above-described, are illustrated in Figs. 5 to 7. In Fig. 5, $$\frac{dB}{d(2\pi f)}$$

is the rate of change with respect to frequency of the phase-function characteristic B of the network 15 that comprises the networks of Figs. 10, 11 or 12, above described. This rate of change of phase function is plotted along the ordinate, and frequency is plotted along the abscissa. The rate of change of the phase function B of the network with frequency is shown at 35, decreasing with increasing frequency. The phase function B itself, on the other hand, gradually increases with increasing frequency as shown at 31 in Fig. 6, rising almost linearly at first, and then asymptotically approaching $\pi$ for increasing frequencies.

In Fig. 7, the derivative or rate of change of curve 35 of Fig. 5 with frequency is shown at 33, varying as a function of frequency. It will be observed that the maximum rate of change of $$\frac{dB}{d(2\pi f)}$$

with frequency, produced by the network 15, as plotted in curve 33, occurs at a point labelled $$\left(\frac{1}{\sqrt{3}}\right)f_1$$

along the frequency abscissa. This square-root of three term may be observed in several of the equations above, where the product of the initial carrier frequency $f_0$ is multiplied by the square root of three. Its significance may now be explained. In the network section of Fig. 11, for example, the frequency $f_1$, above recited, may be defined, as is well-known in the art, as equal to $$\frac{1}{2\pi\sqrt{LC}}$$

The relationship between L, C and the initial pulse carrier frequency $f_0$, in accordance with the present invention, is preferably selected so that $$f_0 = \frac{1}{(2\pi\sqrt{LC})}\left(\frac{1}{\sqrt{3}}\right) = f_1\left(\frac{1}{\sqrt{3}}\right)$$

Under such circumstances, as illustrated in Fig. 7, since the rate of change of $$\frac{dB}{d(2\pi f)}$$

is a maximum at the $$\left(\frac{1}{\sqrt{3}}\right)f_1$$

point, the pulse width of the output pulse is a minimum and the narrowest possible output pulse $\tau_2$ is produced. The derivation of Equations 7 and 8 may now be apparent since the loading resistance R is preferably equal to $$\sqrt{\frac{L}{C}}$$

For a picture of what may physically happen in the network 15 employed in the systems of the present invention, it is perhaps helpful to consider the carrier frequency of the amplitude-modulated pulse carrier wave as successively increasing in frequency with time as shown in Fig. 8, so that at successive equally spaced instants of time $t_2$, $t_3$, $t_4$, and so on, during the pulse, the carrier frequency has successively different values. The phase of the carrier wave at successive instants corresponding, for example, to a wave-length of the initial carrier frequency of the wave, has thus become distorted since at such successive instants the phase of the wave is not constant. The initial carrier frequency $f_0$ at time $t=0$ will pass through the network in a certain time. The next greater carrier frequency $f_2$, at a little later time $t_2$, however, will not have the same travel time in passing through the network. The frequency $f_3$, of the carrier wave at the next instant of time $t_3$, furthermore, will, in turn, have still another travel time, as will the carrier frequency $f_4$ at the next instant of time $t_4$, and so on. A network having a phase function as shown in Fig. 6, will produce successively greater phase shifts for the successively greater carrier frequencies $f_2$, $f_3$, $f_4$, etc., which will tend to cause these successive carrier-wave frequencies of the pulse amplitude-modulated wave to emerge from the network 15 either at approximately the same time or within a closer interval of time than the original time intervals $t_2$, $t_3$, $t_4$, etc., between the different successive frequency values of the carrier wave. It may thus be seen that the ultimate effect of this phase compensation is to crowd together the various frequency components of the frequency modulated or otherwise phase-distorted amplitude-modulated pulse carrier wave. This results in the shaping of the original pulse into a very much narrower pulse width. Since, moreover, for a wave form of the type illustrated in Fig. 8 and networks of the type above described, the output energy from the network 15 is maintained substantially the same as the input energy by proper design of the electrical time constants that permits substantially all of the phase-compensated components to pass through the network, the pulse peak-amplitude of the output pulse will be amplified and will be much greater than the original pulse peak-amplitude, and a pulse output of minimum pulse width will be produced. The output pulse peak-amplitude and pulse width thus varies in accordance with the amount of phase-distortion in the original input pulse for a particular phase-distorted input pulse.

Since, moreover, this pulse shaping and peaking phenomenon occurs because of the phase-compensating design of the network, producing the above-described phenomenon when a phase-distorted amplitude-modulated pulse carrier-wave signal is injected into the network, there can be no corresponding peaking of any other type of signal passed into the network, and this, irrespective of whether the other signal be noise, a broadcast signal or other type of signal. As before mentioned, this provides a means for improving the signal-to-noise ratio of an input signal of the character described, for the desired signal may be detected even though noise and other undesired signals are originally of greater intensity. Though the original signal strength of the desired signal is within the noise level, therefore, in accordance with the present invention, the desired signal may be detected, though it cannot be detached under such circumstances with present-day receiving circuits.

Fig. 13 illustrates a network, the impedance arms of which each comprise two circuit elements. This network is equivalent to the generalized network of Fig. 12, the generalized impedance elements $Z_1$ each comprising a parallely connected inductance and capacitance 47, and the generalized diagonal impedances $Z_2$ each comprising a series-connected capacitance 49 and inductance 51. The inductances of the series arms 47 will have values proportional to, namely twice as large as, the value determined by Equation 7, while the inductances 51 of the diagonal arms will be half as large as, the value given by Equation 7. The capacitance of the series arms 47 will be proportional to, namely half as large as, and the capacitances 49 of diagonal arms will be twice as large as the value determined by Equation 8.

In Fig. 14 a network fully equivalent to that shown in Figs. 10 and 12 is illustrated, comprising two parallel connected arms proportional to $Z_1$ and $Z_2$, Equations 4 and 5, namely $2Z_1$ and $2Z_2$. One input terminal of the network is shown connected to the center tap of the primary of a transformer 53 connected in series with the arms $2Z_1$ and $2Z_2$, and the other input terminal is connected to the direct junction between elements $2Z_1$ and $2Z_2$. The secondary of the transformer 53 is connected to the output terminals of the network. The network of Fig. 14 has the advantageous feature that it cuts in half the number of circuit elements that would be necessary if the network of Fig. 12 were employed. The transformer 53 is represented as an ideal transformer. By connecting the secondary of a practical transformer substituted for the ideal transformer, to an amplifier, the performance of an ideal transformer may be approximated.

In this connection, it should be understood that successive network sections of the networks shown, for example, in Figs. 10 to 13, and in the subsequent figures hereinafter discussed, may be interconnected by amplifiers, not shown, in order to amplify the signals coming from the successive network sections and to produce still higher peak values. Instead of employing a plurality of separate sections, such as, for example, $n$ sections of the type illustrated in Fig. 11, an equivalent single network, such as that shown in generalized form in Figs. 12 and 14, and in specific form in Fig. 13, may be employed. It is frequently not desirable, however, in the interest of extreme accuracy, to substitute a single equivalent network section, Fig. 12, for a very large number of identical fundamental network sections of the type illustrated in Figs. 10 and 11. A more accurate result may be obtained by using several successive sections of networks that are equivalent to a smaller number of fundamental network sections.

Where a symmetrical network such as, for example, the network of Fig. 12, cannot advantageously be employed, as where grounding problems are present, fully equivalent unsymmetrical networks may be used.

Fig. 15, for example, illustrates another network equivalent to the networks shown in Figs. 10, 12 and 14 in which impedances of values proportional to $Z_1$ and $Z_2$, Equations 4 and 5, namely $\frac{1}{2}Z_1$ and $\frac{1}{2}Z_2$, are employed. The upper end of the impedance element $\frac{1}{2}Z_2$ is connected to the center tap of the primary of an ideal transformer 55. The input terminals of the network are shown also connected across the series circuit comprising one-half the primary of the transformer 55 and the impedance $\frac{1}{2}Z_2$. The output terminals are connected across the series circuit comprising the other half of the transformer primary and the impedance $\frac{1}{2}Z_2$. The secondary of the transformer 55 is connected in parallel with the impedance element of $\frac{1}{2}Z_1$. Figs. 16 and 17 illustrate examples of networks of the type illustrated generally in Fig. 15 in which the number of circuit elements comprising the generalized impedances $\frac{1}{2}Z_1$, and $\frac{1}{2}Z_2$ are, respectively, two and four. In Fig. 16, a total of four circuit elements is employed comprising an auto-transformer or closely coupled coils 59—61 corresponding to the ideal transformer 55, a condenser 57 corresponding, in conjunction with the parallel inductance of the transformer 59—61, to the impedance $\frac{1}{2}Z_1$, and a series-connected coil 62 and condenser 63 corresponding to the impedance element $\frac{1}{2}Z_2$. In Fig. 17, a total of eight elements is illustrated comprising an equivalent circuit employing a condenser 65 connected in parallel with a series-connected condenser 67 and coil 69 corresponding, in conjunction with the parallel inductance of an auto-transformer 7—73, to the impedance $\frac{1}{2}Z_1$ of Fig. 15, the auto-transformer or closely coupled coils 71—73 corresponding to the ideal transformer 55 of Fig. 15, and two pairs of series-connected inductances and condensers 77—81 and 75—79, connected in parallel, corresponding to the impedance $\frac{1}{2}Z_2$.

The capacitance 57 of Fig. 16 will have a value one-fourth as large as, and the capacitance 63 will be four times as large as the value determined by Equation 8, while the inductance of the auto-transformer or closely-coupled coils 59—61 will be four times as large as, and the inductance 62 will be one-fours as large as the value determined by Equation 7.

Capacitances 65, 67, 79 and 81 of Fig. 17 may respectively be determined by the expressions $0.01149/Rf_0$, $0.04594/Rf_0$, $0.6274/Rf_0$ and $0.1077/Rf_0$, having respective values of 76.58, 306.3, 4183 and 717.7 micromicrofarads if $f_0=1$ megacycle and $R=150$ ohms. Inductances 69, 75 and 77 are respectively given by $0.1838\ R/f_0$, and the closely-coupled coils 71—73 will have an inductance given by $0.1839\ R/f_0$. For $f_0=1$ megacycle and $R=150$ ohms, for example, the inductances of coils 69, 71—73, 75 and 77 will have the following respective values: 27.57, 27.57, 11.77 and 2.019 microhenries.

Still another equivalent network which corresponds to and is equivalent to the networks of Figs. 10, 12, 14 and 15 and the various embodiments thereof is illustrated in Fig. 18 comprising two impedance elements ½$Z_1$ and ½$Z_2$ connected in series across the input terminals. An output transformer 83 is employed with its primary connected across the impedance element ½$Z_1$. The upper terminal of the transformer secondary is connected to one of the output terminals of the network and the other output terminal is connected to the side of the element ½$Z_2$ that does not connect to the impedance element ½$Z_1$.

The circuit elements $Z_1$ and $Z_2$, of the value given by Equations 4 and 5, in all the above figures may have the generalized form illustrated, for example, in Figs. 19 and 20. Each element may be constituted, for example, as shown in Fig. 19, of a series condenser 85, a plurality of parallel-connected inductances and condensers 87—89, and a series-connected inductance 91. Fig. 20 is another illustration of a form which the impedance elements $Z_1$ or $Z_2$ may take, comprising a plurality of parallel-connected elements comprising a coil 93, a plurality of series-connected inductances and condensers 95—97, 99—101 ... 103—105, all connected in parallel with the coil 93, and a shunt-connected condenser 107. The invention is not, of course, limited to these particular types of impedance elements, for any type of impedance element may, as is well-known in the art, be employed. The impedance elements $Z_1$ and $Z_2$ may, for example, comprise piezoelectric crystals employed with or without appropriate circuit elements to provide the desired impedance. Such crystal circuits are known to be equivalent to inductance and capacitance circuits of the type illustrated, for example, in Figs. 19 and 20, and the other figures. Similarly, at ultra-high frequencies, cavity resonators, which are also equivalent to these L—C circuits, may be employed as impedance elements, as may be sections of transmission lines, and wave guides, as is well-known in the art.

The circuits of Figs. 10, 12, 14, 15 and 18 may be represented in an equivalent Darlington-type of circuit, as shown, for example, in Figs. 21 and 22. In Fig. 21, for example, a generator 109 is shown connected in series with an input resistance R across the input side of a Darlington network comprising two series arms $Z_1$, Equation 4, and two diagonal arms constituted of resistances R which are equal to the input resistance R and the matched output or loading resistor R of the network. This network adds a constant attenuation of 6.02 decibels which does not in any way affect the phase function B of the network. Fig. 22 is a more generalized form of Darlington circuit in which the input resistance $R_1$ and the output resistance $R_2$ have different values, and the diagonal arms of the network have resistances R determined by the geometric mean $\sqrt{R_1R_2}$, of the input and output resistances. The added attenuation of this type of network is given substantially by $$20\ \log\left[1+\tfrac{1}{2}\left(\sqrt{\tfrac{R_1}{R_2}}+\sqrt{\tfrac{R_2}{R_1}}\right)\right]\ \text{decibels}$$

Figure 25:
Figure 26:
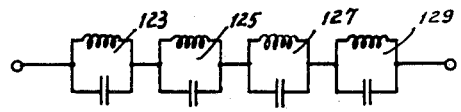

Figs. 23 to 26 illustrate examples of impedance elements, or the equivalent circuits of impedance elements, that may be employed as the impedance elements $Z_1$ of the Darlington circuits of Figs. 21 and 22 and also of the other figures. The advantage of employing impedance elements $Z_2$, of the parallel coil and condenser type, as shown at 111 in Fig. 23, at 113 and 114 in Fig. 24, at 117, 119 and 121 in Fig. 25, and at 123, 125, 127 and 129 in Fig. 26, is that the parallel-connected condenser may take into account the distributive capacitance of the coils.

Figures 23, 24:
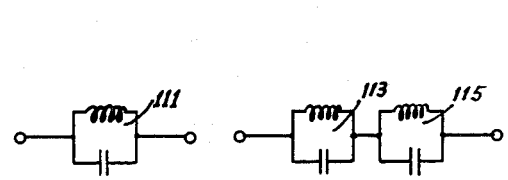

If the two-element inductance-capacitance circuit 111 of Fig. 23 is employed as the impedance element $Z_1$, for example, the inductance will have a value twice the value given by Equation 7, and the capacitance will be half as large as the capacitance determined by Equation 8. For a one-megacycle initial carrier frequency $f_0$ and a resistance R of 150 ohms, for example, the inductance may be 27.56 microhenries and the capacitance may have a value of 306.3 micromicrofarads. For an impedance $Z_1$ of the type illustrated in Fig. 24, the inductance and capacitance of the circuit 113 will have values respectively given substantially by $0.05383\ R/f_0$ and $0.02691/Rf_0$, and the inductance and capacitance of circuit 115 will have respective values of $0.3137\ R/f_0$ and $0.1569/Rf_0$. In the case of $f_0=1$ megacycle and $R=150$ ohms, the inductance and capacitance of circuit 113 will have the respective values of 8.074 microhenries and 179.4 micromicrofarads, and the inductance and capacitance of circuit 115 will respectively be 47.06 microhenries and 1046 micromicrofarads. If the three inductance-capacitance system of Fig. 25 is employed as the impedance elements $Z_1$, the inductances of the circuits 117, 119 and 121 will have values respectively determined by $0.03283\ R/f_0$, $0.06126\ R/f_0$ and $0.4572\ R/f_0$, having respective values of 4.924, 9.189 and 68.58 microhenries when a one megacycle carrier and a 150-ohm R are employed. The capacitances of circuits 117, 119 and 121 will be respectively determined by $0.01847/Rf_0$, $0.1378/Rf_0$ and $0.2572/Rf_0$, having the respective values of 123.1, 918.8 and 1715 micromicrofarads for $f_0=1$ megacycle and $R=150$ ohms. If, moreover, the eight-circuit element system of Fig. 26 is employed as the impedance element $Z_1$, the inductances of circuit 123, 125, 127 and 129 may be determined respectively by $0.03323\ R/f_0$, $0.07443\ R/f_0$, $0.02388\ R/f_0$ and $0.6036\ R/f_0$, having the respective values of 4.984, 11.16, 3.582 and 90.54 microhenries for the above-mentioned values of $f_0$ and R. The capacitances of circuits 123, 125, 127 and 129 will respectively be given by $0.1134/Rf_0$, $0.2541/Rf_0$, $0.01399/Rf_0$ having values of 756.3, 1694, 93.26 and 2357 micromicrofarads for $f_0=1$ megacycle and $R=150$ ohms.

The circuits of Fig. 27 are equivalent to the Darlington circuit of Fig. 21, employing an ideal transformer 131, between the center tap of the primary of which and the bottom terminal of the network, a resistance of value $$\frac{R}{2}$$

is connected, and the secondary of which is connected across an impedance of value ½$Z_1$, Equation 4.

Figs. 28 and 29 illustrate typical examples of networks of the generalized form shown in Fig. 27 employing, respectively, auto-transformers or closely-coupled coils 137 and 147 in place of the ideal transformer 131. The condenser 135 and the inductance of the transformer or coils 137 of Fig. 28 constitute the impedance element ½$Z_1$ of Fig. 27, and the condenser 139, the condenser 141 and coil 145 connected in parallel with the condenser 139, and the coils 147 of Fig. 29 constitute the same element ½$Z_1$.

The capacitance 135 of Fig. 28 may have a value one-fourth that determined by Equation 8 and the value of the inductance of the closely coupled coils 137 may be four times the value given by Equation 7. The values of the capacitances 139 and 141 of Fig. 29 and of the inductances 145 and 147 will be the same respectively, as the values of capacitances 65 and 67 and of inductances 69 and 71—73 of Fig. 17.

Figs. 30 and 31 illustrate circuits for practical inductances L and practical condensers C of the type illustrated in Fig. 11. The circuit of Fig. 30 includes the equivalent dissipative resistance $R_L$ of the inductance L and a shunt resistance $R_0$, and the circuit of Fig. 31 takes into account the parallel dissipative conductance $G_c$ of the condenser C and a series conductance $G_0$.

It may be desired, for design purposes, to take into account a predetermined quantity of attenuation A. If the equivalent circuit elements of Figs. 30 and 31 are considered in place of the inductance L and capacitance C of Fig. 11, the attenuation A may be represented by the equation $$nA = n \coth \frac{L2\pi\sqrt{3}f_0}{R} \quad (17)$$

where $n$ is the number of network sections and R is the loading resistance of the network. Such an additive attenuation may be considered without modifying or changing the phase function B of the network.

For the special case illustrated in Fig. 11, employing one section, having impedance elements $Z_1$ and $Z_2$ of the type illustrated in Figs. 30 and 31, the introduction of the additive attenuation A produces new values for the generalized impedances $Z_1$ and $Z_2$ given by $$Z_1 = \frac{Re^A(\sqrt{3}f_0 + jf) - (\sqrt{3}f_0 - jf)}{e^A(\sqrt{3}f_0 + jf) + (\sqrt{3}f_0 - jf)} \quad (18)$$

$$Z_2 = \frac{Re^A(\sqrt{3}f_0 + jf) + (\sqrt{3}f_0 - jf)}{e^A(\sqrt{3}f_0 + jf) - (\sqrt{3}f_0 - jf)} \quad (19)$$

For the circuit elements of Figs. 30 and 31, these equations reduce to:

$$L = \frac{R}{2\pi f_0 \sqrt{3}\left[1 - \left(\tanh \frac{A}{2}\right)^2\right]} \quad (20)$$

$$R_L = \frac{R \tanh \frac{A}{2}}{1 - \left(\tanh \frac{A}{2}\right)^2} \quad (21)$$

$$R_0 = \frac{R}{\tanh \frac{A}{2}} \quad (22)$$

$$C = \frac{1}{R 2\pi f_0 \sqrt{3}\left[1 - \left(\tanh \frac{A}{2}\right)^2\right]} \quad (23)$$

$$G_c = \frac{\tanh \frac{A}{2}}{R\left[1 - \left(\tanh \frac{A}{2}\right)^2\right]} \quad (24)$$

and $$G_o = \frac{1}{R \tanh \frac{A}{2}} \quad (25)$$

Assuming an added attenuation A of 0.02 nepers, for example, with the illustrative values of $f_0$ and R above-presented, the following values of the parameters of Figs. 30 and 31 may be obtained:

$L = 13.78$ microhenries,
$R_L = 1.5$ ohms.
$R_0 = 15{,}000$ ohms,
$C = 613$ micromicrofarads,
$G_c = 1/15000$ mhos, and
$G_o = 1/1.5$ mhos.

A network may thus be designed to pass any type of amplitude-modulated, phase-distorted pulse carrier wave, introducing phase compensation for the phase distortion in the pulse carrier wave, thereby to narrow the pulse width and to increase the pulse peak-amplitude.

Networks designed to peak the preferred pulse wave of Fig. 8, as represented by Equation 2, have been treated in detail to illustrate the peaking of a pulse without substantial loss of energy and without changing the type of wave-shape of the pulse envelope.

The higher the frequency of the pulse carrier wave, the closer the design and performance of a practical phase-compensating network, constructed in accordance with the above-mentioned principles, will approach the design and performance predicted by the equations. It is to be understood that a similar type of analysis to that herein presented for designing a network to narrow and peak a pulse, applies to the design of a network for widening a pulse by introducing phase-distortion into the pulse carrier wave. In Fig. 3, for example, the phase-compensated and peaked pulse output of the network 15 is shown applied to an inverse network 23 of the character described introducing different phase shifts for each successive frequency component of the amplitude-modulated pulse carrier wave in order to phase distort the output pulse from the network 15 once more, and thereby to increase or widen the pulse width and reduce the pulse peak-amplitude, while maintaining the energy in the pulse wave substantially constant.

Now that the theory underlying phase-distortion of an amplitude-modulated pulse carrier wave and the design of appropriate phase-distortion compensating networks for peaking the pulse carrier wave have been treated, it remains to discuss the preferred communication system of Figs. 32 and 33 that will produce the train of pulse carrier waves shown in Fig. 38.

The block diagram of Fig. 32 illustrates the basic system of Fig. 1, before described, in which the amplitude modulating voltage comprises a train of successive pulse voltages, of the character described. The frequency-modulating voltage from the modulator 5 that controls the carrier frequency variation during the successive pulse voltages from the amplitude modulator 1 is shown varied by a signal modulator 150. The frequency limits of frequency modulation are thus varied from pulse to pulse in accordance with the predetermined signal of the signal modulator 150.

If, for example, the oscillator 3 comprises a reflex "klystron," Fig. 33, the amplitude-modulating voltage 1 may be fed between the cathode 156 and control grid electrode 158 to pulse-amplitude-modulate the electron stream current from the cathode 156. The normal "klystron" electrode and beam voltage supplies are not shown for purposes of simplicity. Since such amplitude modulation may inherently produce some frequency modulation of the "klystron," a conventional frequency-modulating compensating circuit 151 is shown feeding between the resonator grid 160 and the cathode 156 to introduce sufficient properly phased acceleration-voltage frequency modulation to compensate for any frequency modulation introduced by current variation in the "klystron," as is well-known in the art.

A sweep-voltage generator of the saw-tooth variety is shown in Fig. 33 as an example of a convenient frequency-modulating voltage source 5. The generator employs a diode gas tube 168 connected in parallel with a condenser 170 that may be charged from a battery 178 through a variable resistance device 174—176 and a resistance 172. When the voltage across the condenser 170 charges to a value equal to the breakdown voltage of the tube 168, the tube conducts and almost instantaneously discharges the voltage therethrough. The result is that successive saw-tooth sweep voltages are produced of the character shown in Fig. 37, inclinedly rising substantially linearly and then rapidly falling, and these voltages are shown fed by conductors 182 between the repeller electrode 162 and the cathode 156, periodically to drive the repeller electrode negative in saw-tooth fashion.

As the repeller voltage is driven increasingly negative, the frequency of the "klystron" varies as shown in Fig. 35.

Over a portion 154 of the "klystron" frequency-repeller voltage characteristic, the variation in frequency is substantially linear. Over this same region, the output of the "klystron" is substantially constant irrespective of the repeller voltage, as shown at 152 in Fig. 34. The substantially linear saw-tooth sweep voltage, therefore, varies the frequency of the "klystron" substantially linearly over the portion 154 of its frequency characteristic curve. The period of the saw-tooth voltage is made substantially equal to the period of the pulse voltages from the modulator, as by selecting proper values of resistance and capacitance in conjunction with the value of the battery 178 and the particular gas tube 168, so that each pulse carrier wave fed by the coupling loop 164 out of the "klystron" resonator 166 to the antenna 7 is frequency modulated during the pulse; in this case, the frequency of the carrier wave increasing substantially linear from a common predetermined initial carrier frequency during each successive pulse.

It now remains to vary the magnitude of voltage limits of the saw-tooth voltage impulses in accordance with a desired signal in order that the frequency variation of the carrier wave of the successive pulse carrier waves may vary in accordance with the signal. This may be accomplished by employing the variable resistance device 174—176, shown schematically as a resistor 174 over which a movable slider 176 may move to vary the amount of resistance in the condenser charging circuit. The device 174—176 may, for example, be a carbon microphone the resistance of which changes with different sounds. As the resistance of the microphone, or of the device 174—176, changes, the charging rate of the saw-tooth sweep voltage changes. The greater the resistance, the slower or less steep the charging inclined voltage shown in Fig. 37; the less the resistance, the steeper the charging voltage. In a given time, say in the time corresponding to the period of the pulses from the modulator 1, therefore, the condenser C will charge to different voltage peaks depending on the sound affecting the microphone, or the equivalent setting of the device 174—176.

In order to insure that the tube 168 will conduct and discharge the sweep-charging voltage after a period of time corresponding to the period of the amplitude-modulating pulses, irrespective of the value of the voltage on the condenser 170 at that time, a variable resistance device 184—186 is connected in series with the tube 168 across the condenser 170, to change the necessary value of voltage on the condenser 170 needed to break down the tube 168. With the slider 176 in a particular position, a certain resistance is connected in the charging circuit and because of proper voltage and time-constant settings, before mentioned, after an interval of time substantially equal to the period of the amplitude-modulating pulses, the condenser 170 has charged to a predetermined voltage at which the tube 168 conducts, thereby discharging the sweep voltage. If the slider 176 is moved to the right, or if the microphone resistance increases, the charging rate decreases, and in the same interval of time the voltage peak reached is less than that necessary to break down the tube 168. In order to insure that the tube 168 will none-the-less conduct after the said time interval, even though the charging voltage is less than before, it is merely necessary simultaneously to decrease the resistance 184 so that more of the voltage developed across the condenser 170 appears across the tube 168 to break it down. By moving the resistance sliders 186 and 176 in synchronism and in opposite sense, as shown by the dotted ganged connection, Fig. 33, an increase in resistance 174 is accompanied by a decrease in resistance 184, and vice versa, thereby, insuring that, irrespective of the peak voltage reached during the charging of the condenser 170, the tube 168 will always conduct after the said time interval has elapsed, discharging whatever sweep voltage is present across the condenser. In actual practice, both the devices 174—176 and 184—186 may be resistance microphones, both operated simultaneously by the same sound waves.

Instead of varying the resistance of the sweep-voltage charging current, moreover, the capacitance may be varied in accordance with the modulating signal, as is well-known in the art.

For the previously discussed signal 180 of Fig. 36, as an illustration, therefore, the sweep voltage O—$A^1$ will be produced corresponding to the part of the signal O—A; a higher sweep voltage peak $B^1$ will be produced the next sweep corresponding to the greater signal amplitude B; still a higher peak sweep voltage $C^1$ will be produced corresponding to the still higher signal amplitude C; and so on, the peaks of the successive sweep voltages varying with the amplitude of the signal 180, and the period or time interval of each saw-tooth sweep-voltage being a constant, substantially equal to the period of the amplitude-modulating pulses.

The repeller electrode, during successive pulses, is thus swept more or less negative depending on the signal to be transmitted, causing the frequency limits, between which the carrier frequency of the successive pulse carrier waves is swept, to vary accordingly. The first or left-hand pulse carrier wave 39–A of Fig. 38, therefore, has a frequency variation produced by the sweep voltage $OA^1$, the magnitude of which, in turn corresponds to the signal amplitude A; the greater frequency-limit variation of the next pulse carrier wave 39–B is produced by the greater sweep voltage $B^1$ which is controlled by the greater signal amplitude B; and so on.

The network 15, upon the receipt of the transmitted pulse carrier waves, may peak the successive pulse carrier waves by compensating for their respective phase distortions caused by the variable frequency modulation, thereby producing pulses, the peak-amplitude and pulse width of which are measures of the modulating signal intelligence. Detecting the previously discussed pulse amplitude variation $180^1$ of Fig. 39 in the detector 17, will thus reproduce a signal corresponding to the original signal 180.

If desired, any well-known pulse-width discriminator detector might similarly be employed to reproduce the signal by detecting the variation in pulse width of the successive phase-compensated pulse carrier waves.

Other well-known oscillators besides "klystrons," such as oscillating circuits embodying reactance tubes may similarly be amplitude and frequency modulated in the manner above described. Further modifications will occur to those skilled in the art and all such are considered to fall within the spirit and scope of the present invention as defined in the appended claims.

What is claimed is:

1. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves and means for producing different phase shifts for the successive phase-distorted components of each pulse carrier wave to compensate for the varying phase distortion of the successive transmitted pulse carrier waves in order to vary the corresponding pulse width and pulse peak-amplitude in accordance with the variation in phase distortion, thereby to reproduce the signal.

2. In a radio system, apparatus of the character described that comprises means for amplitude-modulating with substantially an error-function envelope and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves and means for producing different phase shifts for the successive phase-distorted components of each pulse carrier wave to compensate for the varying phase distortion of the successive transmitted pulse carrier waves, in order to vary the corresponding pulse width and pulse peak-amplitude in accordance with the variation in phase distortion, thereby to reproduce the signal.

3. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves, network means for producing different phase shifts for the successive phase-distorted components of each pulse carrier wave to compensate for the varying phase distortion of the successive transmitted pulse carrier waves in order to vary the corresponding pulse width and pulse peak amplitude in accordance with the variation in phase distortion, the network means having electrical time constants sufficient to pass substantially all of the compensated phase-distorted components of the successive pulse carrier waves in order to maintain the energy of the pulse carrier waves substantially constant during the phase-distortion compensation, thereby to reproduce the signal.

4. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves, and means for producing successively increasing phase shifts for the successive phase-distorted components of each pulse carrier wave to compensate for the varying phase distortion of the successive transmitted pulse carrier waves in order to narrow the corresponding pulse width and to increase the pulse peak-amplitude in accordance with the variation in phase distortion, thereby to reproduce the signal.

5. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves, network means for producing successively increasing phase shifts for the successive phase-distorted components of each pulse carrier wave to compensate for the varying phase distortion of the successive transmitted pulse carrier waves in order to narrow the corresponding pulse width and to increase the pulse peak-amplitude in accordance with the variation in phase distortion, the network means having electrical time constants sufficient to pass substantially all of the compensated phase-distorted components of the successive pulse carrier waves in order to maintain the energy of the pulse carrier waves substantially constant during the phase-distortion compensation, thereby to reproduce the signal.

6. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves, and means for producing successively decreasing phase shifts for the successive phase-distorted components of each pulse carrier wave to compensate for the varying phase distortion of the successive transmitted pulse carrier waves in order to increase the corresponding pulse width and to reduce the pulse peak-amplitude in accordance with the variation in phase distortion, thereby to reproduce the signal.

7. In a radio system, apparatus of the character described that comprises means for amplitude-modulating and phase-distorting a carrier wave to provide a train of pulse carrier waves each having a predetermined pulse width and pulse peak-amplitude means for varying the phase distortion of the successive pulse carrier waves in accordance with a predetermined signal, means for transmitting the phase-distorted amplitude-modulated pulse carrier waves, network means for producing successively decreasing phase shifts for the successive phase-distorted components of each pulse carrier wave to compensate for the varying phase distortion of the successive transmitted pulse carrier waves in order to increase the corresponding pulse width and to reduce the pulse peak amplitude in accordance with the variation in phase distortion, the network means having electrical time constants sufficient to pass substantially all of the compensated phase-distorted components of the successive pulse carrier waves in order to maintain the energy of the pulse carrier waves substantially constant during the phase-distortion compensation, thereby to reproduce the signal.

8. In a radio system, of the character described that comprises means for frequency-modulating and amplitude-modulating in accordance with an error-function envelope a carrier wave to provide a train of phase-distorted pulse carrier waves each having a predetermined pulse width and pulse peak-amplitude means for varying the frequency modulation of the successive pulse carrier waves in accordance with a predetermined signal, means for transmitting the variably frequency-modulated amplitude-modulated pulse carrier waves, and means for producing different phase shifts for the different frequency components of the variable frequency-modulation to compensate for the phase distortion of the successive transmitted pulse carrier waves in order to vary the corresponding pulse width and pulse peak-amplitude in accordance with the frequency-modulation variation, thereby to reproduce the signal.

9. In a radio system, apparatus of the character described that comprises means for frequency-modulating and amplitude-modulating a carrier wave to provide a train of phase-distorted pulse carrier waves, each having a predetermined pulse width and pulse peak-amplitude, means for varying the frequency modulation of the successive pulse carrier waves in accordance with a predetermined signal, means for transmitting the variably frequency-modulated amplitude-modulated pulse carrier waves, and means for producing different phase shifts for the different frequency components of the variable frequency-modulation to compensate for the phase distortion of the successive transmitted pulse carrier waves in order to vary the corresponding pulse width and pulse peak-amplitude in accordance with the frequency-modulation variation, thereby to reproduce the signal.

10. In a radio system, apparatus of the character described that comprises means for frequency-modulating and amplitude-modulating a carrier wave to provide a train of phase-distorted pulse carrier waves each having a predetermined pulse width and pulse peak-amplitude, means for varying the frequency modulation of the successive pulse carrier waves in accordance with a predetermined signal, means for transmitting the variably frequency-modulated amplitude-modulated pulse carrier waves, network means for producing different phase shifts for the different frequency components of the variable frequency-modulation to compensate for the phase distortion of the successive transmitted pulse carrier waves in order to vary the corresponding pulse width and pulse peak-amplitude in accordance with the frequency-modulation variation, the network having electrical time constants sufficient to pass substantially all of the compensated frequency components of the successive pulse carrier waves in order to maintain the energy of the pulse carrier waves substantially constant during the phase-distortion compensation, thereby to reproduce the signal.

11. In a radio system, apparatus of the character described that comprises means for frequency-modulating and amplitude-modulating a carrier wave to provide a train of phase-distorted pulse carrier waves, each having a predetermined pulse width and pulse peak-amplitude, means for varying the frequency modulation of the successive pulse carrier waves in accordance with a predetermined signal, means for transmitting the variably frequency-modulated amplitude-modulated pulse carrier waves, and means for producing successively increasing phase shifts for the successive frequency components of the variable frequency-modulation to compensate for the phase distortion of the successive transmitted pulse carrier waves in order to narrow the corresponding pulse width and to increase the pulse peak-amplitude in accordance with the frequency-modulation variation, thereby to reproduce the signal.

12. In a radio system, apparatus of the character described that comprises means for frequency-modulating and amplitude-modulating a carrier wave to provide a train of pulse carrier waves, each having a predetermined pulse width and pulse peak-amplitude, means for varying the frequency modulation of the successive pulse carrier waves in accordance with a predetermined signal, means for transmitting the variably frequency-modulated amplitude-modulated pulse carrier waves, means for producing different phase shifts for the different frequency components of the variable frequency-modulation to compensate for the phase distortion of the successive transmitted pulse carrier waves in order to narrow the corresponding pulse width and to increase the pulse peak-amplitude in accordance with the frequency-modulation variation, the last-named means having electrical time constants sufficient to pass substantially all of the compensated frequency components of the successive pulse carrier waves in order to maintain the energy of the pulse carrier waves substantially constant during the phase-distortion compensation, thereby to reproduce the signal.

13. In a radio system, apparatus of the character described that comprises means for frequency-modulating and amplitude-modulating a carrier wave to provide a train of phase-distorted pulse carrier waves, each having a predetermined pulse width and pulse peak-amplitude, means for varying the frequency modulation of the successive pulse carrier waves in accordance with a predeterminal signal, means for transmitting the variably frequency-modulated amplitude-modulated pulse carrier waves, and means for producing successively decreasing phase shifts for the successive frequency components of the variable frequency modulation to compensate for the phase distortion of the successive transmitted pulse carrier waves in order to increase the corresponding pulse width and to reduce the pulse peak-amplitude in accordance with the frequency-modulation variation, thereby to reproduce the signal.

14. In a radio system, apparatus of the character described that comprises means for amplitude-modulating a carrier wave to provide a train of pulse carrier waves, means for changing between predetermined frequency limits the frequency of the successive pulse carrier waves in one direction only during the pulses to phase-distort the pulse carrier waves in order to provide them with a predetermined pulse width and pulse peak-amplitude, means for varying the limits of the frequency modulation of the successive pulse carrier waves in accordance with a predetermined signal, means for transmitting the variably frequency-modulated amplitude-modulated pulse carrier waves, and means for producing different phase shifts for the different frequency components of the variable frequency modulation to compensate for the phase distortion of the successive transmitted pulse carrier waves in order to narrow the corresponding pulse width and to increase the pulse peak-amplitude in accordance with the frequency-modulated variation, thereby to reproduce the signal.

15. In a radio system, apparatus of the character described that comprises means for amplitude-modulating a carrier wave to provide a train of pulse carrier waves, means for changing between predetermined frequency limits the frequency of the successive pulse carrier waves in one direction only during the pulses to phase-distort the pulse carrier waves in order to provide them with a predetermined pulse width and pulse peak-amplitude, means for varying the limits of the frequency modulation of the successive pulse carrier waves in accordance with a predetermined signal, means for transmitting the variably frequency-modulated amplitude-modulated pulse carrier waves, and means for producing different phase shifts for the successively changing frequency components of the successive pulse carrier waves to compensate for the phase distortion of the successive transmitted pulse carrier waves in order to narrow the corresponding pulse width and to increase the pulse peak-amplitude in accordance with the frequency-modulation variation, thereby to reproduce the signal.

16. In a radio system, apparatus of the character described that comprises means for amplitude-modulating a carrier wave to provide a train of pulse carrier waves, means for increasing between predetermined frequency limits the frequency of the successive pulse carrier waves in order to provide them with a predetermined pulse width and pulse peak-amplitude, means for varying the limits of the frequency modulation of the successive pulse carrier waves in accordance with a predetermined signal, means for transmitting the variably frequency-modulated amplitude-modulated pulse carrier waves, and means for producing successively increasing phase shifts for the successive frequency components of the variable frequency-modulation to compensate for the phase distortion of the successive transmitted pulse carrier waves in order to narrow the corresponding pulse width and to increase the pulse peak-amplitude in accordance with the frequency-modulation variation, thereby to reproduce the signal.

17. In a radio system, apparatus of the character described that comprises means for amplitude-modulating a carrier wave to provide a train of pulse carrier waves, means for increasing between predetermined frequency limits the frequency of the successive pulse carrier waves during the pulses to phase-distort the successive pulse carrier waves in order to provide them with a predetermined pulse width and pulse peak-amplitude, means for varying the limits of the frequency modulation of the successive pulse carrier waves in accordance with a predetermined signal, means for transmitting the variably frequency-modulated amplitude-modulated pulse carrier waves, and means for producing successively larger phase shifts for the successively changing frequency components of the successive pulse carrier waves to compensate for the phase distortion of the successive transmitted pulse carrier waves in order to narrow the corresponding pulse width and to increase the pulse peak-amplitude in accordance with the frequency-modulation variation, thereby to reproduce the signal.

18. In a radio system, apparatus of the character described that comprises means for amplitude-modulating a carrier wave to provide a train of pulse carrier waves, means for changing between predetermined frequency limits the frequency of the successive pulse carrier waves in one direction only during the pulses to phase-distort the successive pulse carrier waves in order to provide them with a predetermined pulse width and pulse peak-amplitude, means for varying the limits of the frequency modulation of the successive pulse carrier waves in accordance with a predetermined signal, means for transmitting the variably frequency-modulated amplitude-modulated successive pulse carrier waves, means for producing different phase shifts for the different frequency components of the variable frequency modulation to compensate for the phase distortion of the successive transmitted pulse carrier waves in order to narrow the corresponding pulse width and to increase the pulse peak-amplitude in accordance with the frequency-modulation variations, the last-named means having electrical time constants sufficient to pass substantially all of the compensated frequency components of the successive pulse carrier waves in order to maintain the energy of the successive pulse carrier waves substantially constant during the phase-distortion compensation, thereby to reproduce the signal.

19. In a radio system, apparatus of the character described that comprises means for amplitude-modulating and substantially linearly frequency-modulating between predetermined frequency limits successive portions of a carrier wave to provide a train of phase-distorted pulse carrier waves, each having a predetermined pulse width and pulse peak-amplitude, means for varying the limits of the frequency modulation of the successive pulse carrier waves in accordance with a predetermined signal, means for transmitting the substantially linearly and variably frequency-modulated amplitude-modulated successive pulse carrier waves, and means for producing successively increasing phase shifts for the successive frequency components of the variable frequency-modulation to compensate for the phase distortion of the successive pulse carrier waves in order to narrow the corresponding pulse width and to increase the pulse peak-amplitude in accordance with the frequency-modulation variation, thereby to reproduce the signal.

20. In a radio system, apparatus of the character described that comprises means for amplitude-modulating with substantially an error-function envelope and substantially linearly frequency-modulating between predetermined frequency limits successive portions of a carrier wave to provide a train of phase-distorted pulse carrier waves, each having a predetermined pulse width and pulse peak-amplitude, means for varying the limits of the frequency modulation of the successive pulse carrier waves in accordance with a predetermined signal, means for transmitting the substantially linearly and variably frequency-modulated amplitude-modulated successive pulse carrier waves, and means for producing successively increasing phase shifts for the successive frequency components of the variable frequency-modulation to compensate for the phase distortion of the successive pulse carrier waves in order to narrow the corresponding pulse width and to increase the pulse peak-amplitude in accordance with the frequency-modulation variation, thereby to reproduce the signal.

21. In a radio system, apparatus of the character described that comprises means for amplitude-modulating and phase-distorting a carrier wave to provide a train of pulse carrier waves each having a predetermined pulse width and pulse peak-amplitude, means for varying the phase distortion of the successive pulse carrier waves in accordance with a predetermined signal, means for transmitting the phase-distorted amplitude-modulated pulse carrier waves, means for producing different phase shifts for the successive phase-distorted components of each pulse carrier wave to compensate for the phase-distortion of the successive transmitted pulse carrier waves in order to vary the corresponding pulse width and pulse peak amplitude, means for further transmitting the successive phase-distortion-compensated pulse carrier waves, and means for further phase-distorting the further successive transmitted pulse carrier waves in order further to vary the corresponding pulse width and pulse peak-amplitude.

22. In a radio system, apparatus of the character described that comprises means for amplitude-modulating and phase-distorting a carrier wave to provide a train of pulse carrier waves, each having a predetermined pulse width and pulse peak-amplitude, means for varying the phase distortion of the successive pulse carrier waves in accordance with a predetermined signal, means for transmitting the phase-distorted amplitude-modulated pulse carrier waves, means for producing different phase shifts for the successive phase-distorted components of each pulse carrier wave to compensate for the phase-distortion of the successive transmitted pulse carrier waves in order to vary the corresponding pulse width and pulse peak-amplitude while maintaining the energy of the successive pulse carrier waves substantially constant during the phase-distortion compensation, means for further transmitting the successive phase-distortion-compensated pulse carrier waves, means for further phase-distorting the further successive transmitted pulse carrier waves in order further to vary the corresponding pulse width and pulse peak-amplitude, and means for maintaining the energy of the further successive transmitted pulse carrier waves substantially constant during the further phase-distortion.

23. In a radio system, apparatus for modulating a radio frequency oscillator that comprises, means for producing a train of successive pulse voltages, means for feeding the successive pulse voltages to the oscillator to amplitude-modulate the oscillator, means for producing a train of successive sweep voltages, means for feeding the successive sweep voltages to the oscillator to frequency-modulate the oscillator during the successive pulse voltages in accordance with the successive sweep voltages, and means for varying the magnitude of the successive sweep voltages in accordance with a predetermined signal, thereby to vary the frequency modulation produced during the successive sweep voltages in accordance with the signal.

24. In a radio system, apparatus for modulating a radio-frequency oscillator that comprises, means for producing a train of successive similar pulse voltages, means for feeding the successive pulse voltages to the oscillator to amplitude-modulate the oscillator, means for producing a train of successive saw-tooth voltages of period corresponding substantially to the period of the pulse voltages, means for feeding the successive saw-tooth voltages to the oscillator to frequency-modulate the oscillator during the successive pulse voltages in accordance with the successive saw-tooth voltages, and means for varying the peak magnitude of the successive saw-tooth voltages in accordance with a predetermined signal, thereby to vary the frequency modulation produced during the successive saw-tooth voltages in accordance with the signal.

25. In a radio system, a source of carrier waves, means for pulse-amplitude-modulating the carrier waves to produce a train of successive pulse carrier waves, means for phase-distorting the successive pulse carrier waves, means for producing a signal, means responsive to the signal-producing means for varying the phase distortion of the successive pulse carrier waves in accordance with the signal, means for transmitting the variably phase-distorted pulse carrier waves, means for receiving the transmitted waves, and a network connected to the receiving means having means for producing different phase shifts for the successive phase-distorted components of each pulse carrier wave to compensate for the phase distortion of the successive amplitude-modulated pulse carrier waves, thereby to reproduce the signal.

26. In a radio system, a source of carrier waves, means for pulse-amplitude-modulating the carrier waves to produce a train of successive pulse carrier waves, means for frequency-modulating the successive pulse carrier waves thereby to phase-distort the waves, means for producing a signal, means responsive to the signal-producing means for varying the frequency modulation and hence the phase distortion of the successive pulse carrier waves in accordance with the signal, means for transmitting the variably phase-distorted pulse carrier waves, means for receiving the transmitted waves, and a network connected to the receiving means having means for producing different phase shifts for the different frequency components of the variable frequency-modulation to compensate for the phase distortion of the successive amplitude-modulated frequency-modulated pulse carrier waves the last-named means having electrical time constants sufficient to pass substantially all of the compensated frequency components of the successive pulse carrier waves in order to maintain the energy of the pulse carrier waves substantially constant during the phase-distortion compensation, thereby to reproduce the signal.

27. In a radio system, a source of carrier waves, means for pulse-amplitude-modulating the carrier waves to produce a train of successive pulse carrier waves, means for linearly frequency-modulating between predetermined frequency limits the successive pulse carrier waves during the pulses to phase-distort the waves, means for producing a signal, means responsive to the signal-producing means for varying the limits of frequency modulation during the successive pulses and hence varying the degree of phase distortion of the successive pulse carrier waves in accordance with the signal, means for transmitting the variably phase-distorted pulse carrier waves, means for receiving the transmitted waves, and a network connected to the receiving means and having means for producing different phase shifts for the successive phase-distorted components of each pulse carrier wave to compensate for the phase distortion of the amplitude-modulated linearly frequency-modulated pulse carrier waves, thereby to reproduce the signal.

28. In a radio system, a source of carrier waves, means for amplitude-modulating with substantially an error-function envelope the carrier waves to produce a train of successive pulse carrier waves, means for frequency-modulating the successive pulse carrier waves thereby to phase-distort the waves, means for producing a signal, means responsive to the signal-producing means for varying the frequency modulation and hence the phase distortion of the successive pulse carrier waves in accordance with the signal, means for transmitting the variably phase-distorted pulse carrier waves, means for receiving the transmitted waves, and a network connected to the receiving means and having network elements for producing different phase shifts for the different phase-distorted components of each pulse carrier wave to compensate for the phase distortion of the successive amplitude-modulated frequency-modulated pulse carrier waves while for maintaining the energy of the pulse carrier waves substantially constant during the phase-distortion compensation, thereby to reproduce the signal.

29. In a radio system, means for transmitting as a function of time $t$ a train of amplitude-modulated linearly frequency-modulated pulse carrier waves, each pulse carrier wave $u_1$ being represented substantially by the equation $$u_1 = e^{-\alpha t^2} \cos(2\pi f_0 t + \beta t^2 + \phi)$$

where
$e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier wave, and
$\phi$ is the phase of the pulse carrier wave at the initial time $t=0$, and having a pulse width $\tau_1$ given substantially by the equation $$\tau_1 = 2\sqrt{3} \sqrt{\frac{\int_{-\infty}^{\infty} t^2 u_1^2 dt}{\int_{-\infty}^{\infty} u_1^2 dt}}$$

where $\tau_1 f_0$ is very much greater than 0.276, means for producing a signal, means for varying the rate of change $2\beta$ of the linearly varying frequency $f$ of the pulse carrier-wave in accordance with the signal, and means for receiving and producing different phase shifts for the different frequency components of the varying frequency-modulation of the successive transmitted pulse carrier waves comprising a network having a number $n$ of sections determined substantially by the equation $$n = 15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2 = 2\sqrt{3} \sqrt{\frac{\int_{-\infty}^{\infty} t^2 u_2^2 dt}{\int_{-\infty}^{\infty} u_2^2 dt}}$$

where $u_2$ is the output pulse represented substantially by the equation $$u_2 = \sqrt{\frac{\tau_1}{\tau_2}} e^{-\epsilon(t')^2} \cos\left\{2\pi f_0 t' + \xi(t')^2 + \left(\frac{\sqrt{3}}{2} - \frac{\pi}{3}\right)n + \phi + \psi\right\}$$

in which substantially the following relationships exist:

$$\epsilon = \alpha \left(\frac{\tau_1}{\tau_2}\right)^2$$

$$t' = t - \left(\frac{1}{2\pi}\right)\left(\frac{dB}{df}\right)_{f=f_0}$$

$$B = jn \, \ln\left(\frac{k\sqrt{3}f_0 - jf}{k\sqrt{3}f_0 + jf}\right)$$

$j$ is the operator $\sqrt{-1}$,
$k$ is a constant in the neighborhood of unity, $$\xi = \left[\beta - \left(\frac{1}{2\pi}\right)\left(\frac{dB}{df}\right)_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

each of the $n$ sections of the networks having arms of impedances respectively substantially proportional to $$Z_1 = \frac{R j U_m(f)}{G_m(f)}$$

and $$Z_2 = \frac{R G_m(f)}{j U_m(f)}$$

where
$R$ is the loading resistance of the network,
$G_m$ is the even or real part, and
$U_m$ is the odd or imaginary part, of the function $$\frac{(f_0\sqrt{3} - jf)^n}{(f_0\sqrt{3} + jf)^n}$$

30. The radio system of claim 29 in which the factor of proportionality to $Z_1$ and $Z_2$ of the impedances of the arms of the network is equal to unity.

31. The radio system of claim 29 in which the following relationships are substantially satisfied:

$$\alpha = \frac{3}{\tau_1^2}$$

and $$\beta = \frac{1 - \left(\frac{\tau_1}{\tau_2}\right)\sqrt{1-p^2}}{\sqrt{3}} \left(\frac{8\pi^2 f_0^2}{n}\right)$$

32. The radio system of claim 29 in which the following relationships are substantially satisfied:

$$\alpha = \frac{3}{\tau_1^2}$$

and $$\beta = \frac{8\pi^2 f_0^2}{\sqrt{3}\, n}$$

33. The radio system of claim 29 in which the following relationships are substantially satisfied:

$$\alpha = \frac{3}{\tau_1^2}$$

$$\beta = \frac{1 - \left(\frac{\tau_1}{\tau_2}\right)\sqrt{1-p^2}\left(\frac{8\pi^2 f_0^2}{n}\right)}{\sqrt{3}}$$

$$2\pi f_0 \left(\frac{1}{2\sqrt{\alpha}}\right) - \beta\left(\frac{1}{2\sqrt{\alpha}}\right)^2 \gg 2\pi$$

and $$2\pi f_0 \left(\frac{1}{2\sqrt{\alpha}}\right) - |\xi|\left(\frac{1}{2\sqrt{\epsilon}}\right) \gg 2\pi$$

where >> is a symbol indicating very much greater than and $|\xi|$ is the magnitude of the $\xi$.

34. In a radio system, means for transmitting as a function of time $t$ a train of amplitude-modulated linearly frequency-modulated pulse carrier waves, each pulse carrier wave $u_1$ being represented substantially by the equation $$u_1 = e^{-\alpha t^2} \cos\, (2\pi f_0 t + \beta t^2 + \phi)$$

where $e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier-wave, and
$\phi$ is the phase of the pulse carrier wave at the initial time $t=0$, and having a pulse width $\tau_1$ given substantially by the equation $$\tau_1 = 2\sqrt{3}\, \sqrt{\frac{\int_{-\infty}^{\infty} t^2 u_1^2 dt}{\int_{-\infty}^{\infty} u_1^2 dt}}$$

where $\tau_1 f_0$ is very much greater than 0.276, means for producing a signal, means for varying the rate of change $2\beta$ of the linearly varying frequency $f$ of the pulse carrier-wave in accordance with the signal, and means for receiving and producing different phase shifts for the different frequency components of the varying frequency-modulation of the successive transmitted pulse carrier waves comprising a network having a number $n$ of sections determined substantially by the equation $$n = 15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2 = 2\sqrt{3}\, \sqrt{\frac{\int_{-\infty}^{\infty} t^2 u_2^2 dt}{\int_{-\infty}^{\infty} u_2^2 dt}}$$

where $u_2$ is the output pulse represented substantially by the equation $$u_2 = \sqrt{\frac{\tau_1}{\tau_2}}\, e^{-\epsilon(t')^2} \cos\left\{2\pi f_0 t' + \xi(t')^2 + \left(\frac{\sqrt{3}}{2} - \frac{\pi}{3}\right)n + \phi + \psi\right\}$$

in which substantially the following relationships exist:

$$\epsilon = \alpha\left(\frac{\tau_1}{\tau_2}\right)^2$$

$$t' = t - \left(\frac{1}{2\pi}\right)\left(\frac{dB}{df}\right)_{f=f_0}$$

$$B = jn\, \ln\left(\frac{k\sqrt{3}\, f_1 - jf}{k\sqrt{3}\, f_0 + jf}\right)$$

$j$ is the operator $\sqrt{-1}$,
$k$ is a constant in the neighborhood of unity, $$\xi = \left[\beta - \frac{1}{2\pi}\frac{dB}{df}\Big|_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

each of the $n$ sections of the network having arms of impedances respectively substantially proportional to $$Z_1 = \frac{RjU_m(f)}{G_m(f)}$$

and $$R$$

where
$R$ is the loading resistance of the network,
$G_m$ is the even or real part, and
$U_m$ is the odd or imaginary part,
of the function $$\frac{(f_0\sqrt{3} - jf)^n}{(f_0\sqrt{3} + jf)^n}$$

35. In a radio system, means for transmitting as a function of time $t$ a train of amplitude-modulated linearly frequency-modulated pulse carrier waves, each pulse carrier wave $u_1$ being represented substantially by the equation $$u_1 = e^{-\alpha t^2} \cos\, (2\pi f_0 t + \beta t^2 + \phi)$$

where $e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier-wave, and
$\phi$ is the phase of the pulse carrier wave at the initial time $t=0$, and having a pulse width $\tau_1$ given substantially by the equation $$\tau_1 = 2\sqrt{3}\sqrt{\frac{\int_{-\infty}^{\infty} t^2 u_1^2 dt}{\int_{-\infty}^{\infty} u_1^2 dt}}$$

where $\tau_1 f_0$ is very much greater than 0.276, means for producing a signal, means for varying the rate of change $2\beta$ of the linearly varying frequency $f$ of the pulse carrier-wave in accordance with the signal, and means for receiving and producing different phase shifts for the different frequency components of the varying frequency-modulation of the successive transmitted pulse carrier waves comprising a network having a number $n$ of sections determined substantially by the equation $$n = 15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2 = 2\sqrt{3}\sqrt{\frac{\int_{-\infty}^{\infty} t^2 u_2^2 dt}{\int_{-\infty}^{\infty} u_2^2 dt}}$$

where $u_2$ is the output pulse represented substantially by the equation $$u_2 = \sqrt{\frac{\tau_1}{\tau_2}} e^{-\epsilon(t')^2} \cos\left\{2\pi f_0 t' + \xi(t')^2 + \left(\frac{\sqrt{3}}{2} - \frac{\pi}{3}\right)n + \phi + \psi\right\}$$

in which substantially the following relationships exist:

$$\epsilon = \alpha \left(\frac{\tau_1}{\tau_2}\right)^2$$

$$t' = t - \left(\frac{1}{2\pi}\right)\left(\frac{dB}{df}\right)_{f=f_0}$$

$$B = jn \ln\left(\frac{k\sqrt{3}f_0 - jf}{k\sqrt{3}f_0 + jf}\right)$$

$j$ is the operator $\sqrt{-1}$,
$k$ is a constant in the neighborhood of unity, $$\xi = \left[\beta - \left(\frac{1}{2\pi}\frac{dB}{df}\right)_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

each of the $n$ sections of the network having arms of impedances respectively substantially proportional to $$Z_1 = \frac{RjU_m(f)}{G_m(f)}$$

and $$R$$

where $R$ is the geometric mean $\sqrt{R_1 R_2}$ of the input impedance $R_1$ and the loading resistance $R_2$ of the network,
$G_m$ is the even or real part, and
$U_m$ is the odd or imaginary part,
of the function $$\frac{(f_0\sqrt{3} - jf)^n}{(f_0\sqrt{3} + jf)^n}$$

36. In a radio system, means for transmitting as a function of time $t$ a train of amplitude-modulated linearly frequency-modulated pulse carrier waves, each pulse carrier wave $u_1$ being represented substantially by the equation $$u_1 = e^{-\alpha t^2} \cos(2\pi f_0 t + \beta t^2 + \phi)$$

where $e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier wave, and
$\phi$ is the phase of the pulse carrier wave at the initial time $t=0$, and having a pulse width $\tau_1$ given substantially by the equation $$\tau_1 = 2\sqrt{3}\sqrt{\frac{\int_{-\infty}^{\infty} t^2 u_1^2 dt}{\int_{-\infty}^{\infty} u_1^2 dt}}$$

where $\tau_1 f_0$ is very much greater than 0.276, means for producing a signal, means for varying the rate of change $2\beta$ of the linearly varying frequency $f$ of the pulse carrier wave in accordance with the signal, and means for receiving and producing different phase shifts for the different frequency components of the varying frequency-modulation of the successive transmitted pulse carrier waves comprising a network having a number $n$ of sections determined substantially by the equation $$n = 15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2 = 2\sqrt{3}\sqrt{\frac{\int_{-\infty}^{\infty} t^2 u_2^2 dt}{\int_{-\infty}^{\infty} u_2^2 dt}}$$

where $u_2$ is the output pulse represented substantially by the equation $$u_2 = \sqrt{\frac{\tau_1}{\tau_2}} e^{-\epsilon(t')^2} \cos\left\{2\pi f_0 t' + \xi(t')^2 + \left(\frac{\sqrt{3}}{2} - \frac{\pi}{3}\right)n + \phi + \psi\right\}$$

in which substantially the following relationships exist:

$$\epsilon = \alpha \left(\frac{\tau_1}{\tau_2}\right)^2$$

$$t' = t - \left(\frac{1}{2\pi}\right)\left(\frac{dB}{df}\right)_{f=f_0}$$

$$B = jn \ln\left(\frac{k\sqrt{3}f_0 - jf}{k\sqrt{3}f_0 + jf}\right)$$

$j$ is the operator $\sqrt{-1}$, $k$ is the constant in the neighborhood of unity, $$\xi = \left[\beta - \left(\frac{1}{2\pi}\right)\left(\frac{dB}{df}\right)_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

each of the $n$ sections of the network having arms of inductance L substantially proportional to $$L=\frac{R}{2\sqrt{3}\pi f_0}$$

where R is the loading resistance of the network, and arms of capacitance C substantially proportional to $$C=\frac{1}{2\sqrt{3}\pi f_0 R}$$

37. In a radio system, means for transmitting as a function of time $t$ a train of amplitude-modulated linearly frequency-modulated pulse carrier waves, each pulse carrier wave $u_1$ being represented substantially by the equation $$u_1=e^{-\alpha t^2}\cos(2\pi f_0 t+\beta t^2+\phi)$$

where $e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier wave, and
$\phi$ is the phase of the pulse carrier wave at the initial time $t=0$, and having a pulse width $\tau_1$ given substantially by the equation $$\tau_1=2\sqrt{3}\sqrt{\frac{\int_{-\infty}^{\infty}t^2 u_1^2 dt}{\int_{-\infty}^{\infty}u_1^2 dt}}$$

where $\tau_1 f_0$ is very much greater than 0.276, means for producing a signal, means for varying the rate of change $2\beta$ of the linearly varying frequency $f$ of the pulse carrier wave in accordance with the signal, and means for receiving and producing different phase shifts for the different frequency components of the varying frequency-modulation of the successive transmitted pulse carrier waves comprising a network having a number $n$ of sections determined substantially by the equation $$n=15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2=2\sqrt{3}\sqrt{\frac{\int_{-\infty}^{\infty}t^2 u_2^2 dt}{\int_{-\infty}^{\infty}u_2^2 dt}}$$

where $u_2$ is the output pulse represented substantially by the equation $$u_2=\sqrt{\frac{\tau_1}{\tau_2}}e^{-\epsilon(t')^2}\cos\left\{2\pi f_0 t'+\xi(t')^2+\left(\frac{\sqrt{3}}{2}-\frac{\pi}{3}\right)n+\phi+\psi\right\}$$

in which substantially the following relationships exist:

$$\epsilon=\alpha\left(\frac{\tau_1}{\tau_2}\right)^2$$

$$t'=t-\left(\frac{1}{2\pi}\right)\left(\frac{dB}{df}\right)_{f=f_0}$$

$$B=jn\ln\left(\frac{k\sqrt{3}f_0-jf}{k\sqrt{3}f_0+jf}\right)$$

$j$ is the operator $\sqrt{-1}$, $k$ is a constant in the neighborhood of unity, $$\xi=\left[\beta-\left(\frac{1}{2\pi}\right)\left(\frac{dB}{df}\right)_{f=f_0}\left(\frac{\alpha^2+\beta^2}{2\pi f_0}\right)\right]\left(\frac{\tau_1}{\tau_2}\right)^2$$

and $$\tan 2\psi=\frac{\alpha\left(\frac{1}{2\pi}\right)\left(\frac{dB}{df}\right)_{f=f_0}}{2\pi f_0-\left(\frac{\beta}{2\pi}\right)\left(\frac{dB}{df}\right)_{f=f_0}}$$

each of the $n$ sections having two series arms of inductance L substantially equal to $$L=\frac{R}{2\sqrt{3}\pi f_0}$$

where R is the loading resistance of the network, and two diagonal arms of capacitance C substantially equal to $$C=\frac{1}{2\sqrt{3}\pi f_0 R}$$

38. In a radio system, means for transmitting as a function of time $t$ a train of amplitude-modulated linearly frequency-modulated pulse carrier waves, each pulse carrier wave $u_1$ being represented substantially by the equation $$u_1=e^{-\alpha t^2}\cos(2\pi f_0 t+\beta t^2+\phi)$$

where $e$ is the base of natural logarithms,
$\alpha$ is an attenuation constant of the pulse carrier wave,
$\pi$ is the ratio of the circumference to the diameter of a circle,
$f_0$ is the frequency of the pulse carrier wave at the initial time $t=0$, at the commencement of each pulse carrier wave,
$2\beta$ is the rate of change of the linearly varying frequency $f$ of the pulse carrier wave, and
$\phi$ is the phase of the pulse carrier wave at the initial time $t=0$;

and having a pulse width $\tau_1$ given substantially by the equation $$\tau_1=2\sqrt{3}\sqrt{\frac{\int_{-\infty}^{\infty}t^2 u_1^2 dt}{\int_{-\infty}^{\infty}u_1^2 dt}}$$

where $\tau_1 f_0$ is very much greater than 0.276, means for producing a signal, means for varying the rate of change $2\beta$ of the linearly varying frequency $f$ of the pulse carrier wave in accordance with the signal, and means for receiving and producing different phase shifts for the different frequency components of the varying frequency-modulation of the successive transmitted pulse carrier waves comprising a network having a number $n$ of sections determined substantially by the equation $$n=15.2 f_0 p \tau_1 \tau_2$$

where $p$ is that constant equal to or less than unity, but as near to unity as possible, required to render $n$ the nearest whole number, and $\tau_2$ is the pulse width of the output pulses emerging from the network, given substantially by the equation $$\tau_2=2\sqrt{3}\sqrt{\frac{\int_{-\infty}^{\infty}t^2 u_2^2 dt}{\int_{-\infty}^{\infty}u_2^2 dt}}$$

where $u_2$ is the output pulse represented substantially by the equation $$u_2=\sqrt{\frac{\tau_1}{\tau_2}}e^{-\epsilon(t')^2}\cos\left\{2\pi f_0 t'+\xi(t')^2+\left(\frac{\sqrt{3}}{2}-\frac{\pi}{3}\right)n+\phi+\psi\right\}$$

in which substantially the following relationships exist:

$$\epsilon=\alpha\left(\frac{\tau_1}{\tau_2}\right)^2$$

$$t' = t - \left(\frac{1}{2\pi}\right)\left(\frac{dB}{df}\right)_{f=f_0}$$

$$B = jn \ln\left(\frac{k\sqrt{3}f_0 - jf}{k\sqrt{3}f_0 + jf}\right)$$

$j$ is the operator $\sqrt{-1}$,
$k$ is a constant in the neighborhood of unity, $$\xi = \left[\beta - \left(\frac{1}{2\pi}\right)\left(\frac{dB}{df}\right)_{f=f_0}\left(\frac{\alpha^2 + \beta^2}{2\pi f_0}\right)\right]\left(\frac{\tau_1}{\tau_2}\right)^2$$

and $$\tan 2\psi = \frac{\alpha\left(\frac{1}{2\pi}\right)\left(\frac{dB}{df}\right)_{f=f_0}}{2\pi f_0 - \left(\frac{\beta}{2\pi}\right)\left(\frac{dB}{df}\right)_{f=f_0}}$$

the network having arms of inductance L containing series resistance $R_L$ and shunt resistance $R_0$ and arms of capacitance C containing shunt conductance $G_c$ and series conductance $G_0$, and an added attenuation A substantially proportional to $$A = \coth \frac{L 2\pi\sqrt{3}f_0}{R}$$

where R is the loading resistance of the network, the inductance L having a value substantially proportional to $$\frac{R}{2\pi f_0 \sqrt{3}\left[1 - \left(\tanh \frac{A}{2}\right)^2\right]}$$

the series resistance $R_L$, substantially proportional to $$\frac{R \tanh \frac{A}{2}}{\left[1 - \left(\tanh \frac{A}{2}\right)^2\right]}$$

the shunt resistance $R_0$, substantially proportional to $$\frac{R}{\tanh \frac{A}{2}}$$

the capacitance C substantially proportional to $$\frac{1}{R 2\pi f_0 \sqrt{3}\left[1 - \left(\tanh \frac{A}{2}\right)^2\right]}$$

the shunt conductance $G_c$ substantially proportional to $$\frac{\tanh \frac{A}{2}}{R\left[1 - \left(\tanh \frac{A}{2}\right)^2\right]}$$

and
the series conductance $G_0$ substantially proportional to $$\frac{1}{R \tanh \frac{A}{2}}$$

References Cited in the file of this patent
UNITED STATES PATENTS

| Number | Name | Date |
|---|---|---|
| Re. 21,955 | Chaffee | Nov. 25, 1941 |
| Re. 23,288 | Krumhansl | Oct. 24, 1950 |
| 1,734,038 | Levy | Nov. 5, 1929 |
| 1,861,462 | Trouant | June 7, 1932 |
| 1,887,237 | Finch | Nov. 8, 1932 |
| 1,956,397 | Nicolson | Apr. 24, 1934 |
| 2,061,734 | Kell | Nov. 24, 1936 |
| 2,227,108 | Roosenstein | Dec. 31, 1940 |
| 2,361,437 | Trevor | Oct. 31, 1944 |
| 2,380,959 | Frankel | Aug. 7, 1945 |
| 2,392,546 | Peterson | Jan. 8, 1946 |
| 2,407,308 | Lorenzen et al. | Sept. 10, 1946 |
| 2,433,804 | Wolff | Dec. 30, 1947 |
| 2,448,055 | Silver et al. | Aug. 31, 1948 |
| 2,457,137 | Earp et al. | Dec. 28, 1948 |
| 2,462,852 | Frankel | Mar. 1, 1949 |
| 2,465,341 | Altovsky | Mar. 29, 1949 |
| 2,476,337 | Varian | July 19, 1949 |